(12) United States Patent
Tseng et al.

(10) Patent No.: US 10,209,488 B2
(45) Date of Patent: Feb. 19, 2019

(54) OPTICAL IMAGING LENS ASSEMBLY, IMAGE CAPTURING UNIT AND ELECTRONIC DEVICE

(71) Applicant: LARGAN Precision Co., Ltd., Taichung (TW)

(72) Inventors: Yu-Tai Tseng, Taichung (TW); Chun-Che Hsueh, Taichung (TW); Tzu-Chieh Kuo, Taichung (TW)

(73) Assignee: LARGAN Precision Co., Ltd., Taichung (TW)

( * ) Notice: Subject to any disclaimer, the term of this patent is extended or adjusted under 35 U.S.C. 154(b) by 0 days.

(21) Appl. No.: 15/631,994

(22) Filed: Jun. 23, 2017

(65) Prior Publication Data

US 2018/0341086 A1   Nov. 29, 2018

(30) Foreign Application Priority Data

May 26, 2017   (TW) .............................. 106117735 A

(51) Int. Cl.
```
G02B 9/60      (2006.01)
G02B 13/00     (2006.01)
G02B 13/14     (2006.01)
G02B 13/18     (2006.01)
```

(52) U.S. Cl.
CPC ....... *G02B 13/0045* (2013.01); *G02B 13/146* (2013.01); *G02B 13/18* (2013.01); *G02B 9/60* (2013.01)

(58) Field of Classification Search
CPC ... G02B 9/60; G02B 9/62; G02B 9/64; G02B 13/0045

USPC ....... 359/713, 714, 746, 755–757, 763, 764, 359/767, 770
See application file for complete search history.

(56) References Cited

U.S. PATENT DOCUMENTS

| | | | |
|---|---|---|---|
| 4,815,831 A | 3/1989 | Betensky | |
| 7,110,188 B2 * | 9/2006 | Matsui | G02B 9/34 359/714 |
| 7,697,220 B2 | 4/2010 | Iyama | |
| 8,654,242 B2 | 2/2014 | Matsusaka et al. | |
| 9,235,031 B2 | 1/2016 | Chung et al. | |
| 9,529,179 B2 | 12/2016 | Huang et al. | |

(Continued)

FOREIGN PATENT DOCUMENTS

| | | |
|---|---|---|
| CN | 106415350 | 2/2017 |
| CN | 106646822 | 5/2017 |

(Continued)

OTHER PUBLICATIONS

Taiwan Intellectual Property Office, Office Action and Search Report issued in connection with Taiwan Application No. 106117735, dated Apr. 12, 2018, 10 pages.

*Primary Examiner* — Darryl J Collins

(74) *Attorney, Agent, or Firm* — Hanely, Flight & Zimmerman, LLC

(57) ABSTRACT

An optical imaging lens assembly includes, in order from an object side to an image side: a first lens element, a second lens element, a third lens element, a fourth lens element and a fifth lens element. The first lens element has an object-side surface being concave in a paraxial region thereof. The second lens element has positive refractive power. The third lens element has negative refractive power. The fourth lens element has positive refractive power. The fifth lens element has negative refractive power.

25 Claims, 26 Drawing Sheets

(56) References Cited

U.S. PATENT DOCUMENTS

| | | | |
|---|---|---|---|
| 9,696,519 B1 | 7/2017 | Chen et al. | |
| 2011/0273611 A1 | 11/2011 | Matsusaka et al. | |
| 2014/0029117 A1* | 1/2014 | Noda | G02B 13/0045 359/714 |
| 2017/0123185 A1 | 5/2017 | Choi | |
| 2017/0168264 A1* | 6/2017 | Chen | G02B 9/60 |
| 2017/0168266 A1 | 6/2017 | Hsu et al. | |
| 2017/0176720 A1 | 6/2017 | Zhao et al. | |
| 2017/0205604 A1 | 7/2017 | Hsu et al. | |
| 2017/0336604 A1* | 11/2017 | Hsu | G02B 9/62 |

FOREIGN PATENT DOCUMENTS

| | | |
|---|---|---|
| JP | 2008281760 | 11/2008 |
| JP | 2010008562 | 1/2010 |
| JP | 2012113311 | 6/2012 |
| TW | 201627716 | 8/2016 |
| WO | 2012132456 | 10/2012 |

* cited by examiner

OPTICAL IMAGING LENS ASSEMBLY, IMAGE CAPTURING UNIT AND ELECTRONIC DEVICE

RELATED APPLICATIONS

This application claims priority to Taiwan Application 106117735, filed May 26, 2017, which is incorporated by reference herein in its entirety.

BACKGROUND

Technical Field

The present disclosure relates to an optical imaging lens assembly, an image capturing unit and an electronic device, more particularly to an optical imaging lens assembly and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, and compact optical systems have gradually evolved toward the field of higher megapixels, there is an increasing demand for compact optical systems featuring better image quality.

With the development of technology, there is an increasing demand for electronic devices providing various imaging functionalities. Therefore, it is difficult for camera modules having a single camera to meet the various requirements for the electronic devices. Accordingly, electronic devices, such as smart phones, equipped with camera modules having dual or multiple cameras have become the mainstream products recently. Furthermore, for various applications, the demand for camera modules featuring wide field of view has been increasing. Therefore, there is a desperate need to develop a miniaturized and wide-angle optical system featuring high image quality.

SUMMARY

According to one aspect of the present disclosure, an optical imaging lens assembly includes five lens elements. The five lens elements are, in order from an object side to an image side, a first lens element, a second lens element, a third lens element, a fourth lens element and a fifth lens element. The first lens element has an object-side surface being concave in a paraxial region thereof, wherein the object-side surface of the first lens element has at least one convex critical point in an off-axial region thereof, and the object-side surface of the first lens element is aspheric. The second lens element has positive refractive power. The third lens element has negative refractive power. The fourth lens element has positive refractive power. The fifth lens element has negative refractive power. When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a focal length of the first lens element is f1, and a curvature radius of an image-side surface of the first lens element is R2, the following conditions are satisfied:

$$0<(T23+T34+T45)/T12<2.2; \text{ and}$$

$$|f1|/R2 \leq 0.$$

According to another aspect of the present disclosure, an image capturing unit includes the aforementioned optical imaging lens assembly and an image sensor, wherein the image sensor is disposed on an image surface of the optical imaging lens assembly.

According to still another aspect of the present disclosure, an electronic device includes the aforementioned image capturing unit.

According to yet another aspect of the present disclosure, an optical imaging lens assembly includes five lens elements. The five lens elements are, in order from an object side to an image side, a first lens element, a second lens element, a third lens element, a fourth lens element and a fifth lens element. The first lens element with negative refractive power has an object-side surface being concave in a paraxial region thereof. The second lens element has positive refractive power. The third lens element has negative refractive power. The fourth lens element has positive refractive power. The fifth lens element with negative refractive power has an image-side surface being concave in a paraxial region thereof, wherein the image-side surface of the fifth lens element has at least one convex critical point in an off-axial region thereof, and the image-side surface of the fifth lens element is aspheric. When an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a focal length of the first lens element is f1, and a curvature radius of an image-side surface of the first lens element is R2, the following conditions are satisfied:

$$0<(T23+T34+T45)/T12<2.2; \text{ and}$$

$$|f1|/R2 \leq 0.$$

BRIEF DESCRIPTION OF THE DRAWINGS

The disclosure can be better understood by reading the following detailed description of the embodiments, with reference made to the accompanying drawings as follows.

DETAILED DESCRIPTION

An optical imaging lens assembly includes, in order from an object side to an image side, a first lens element, a second lens element, a third lens element, a fourth lens element and a fifth lens element.

Figure 25:
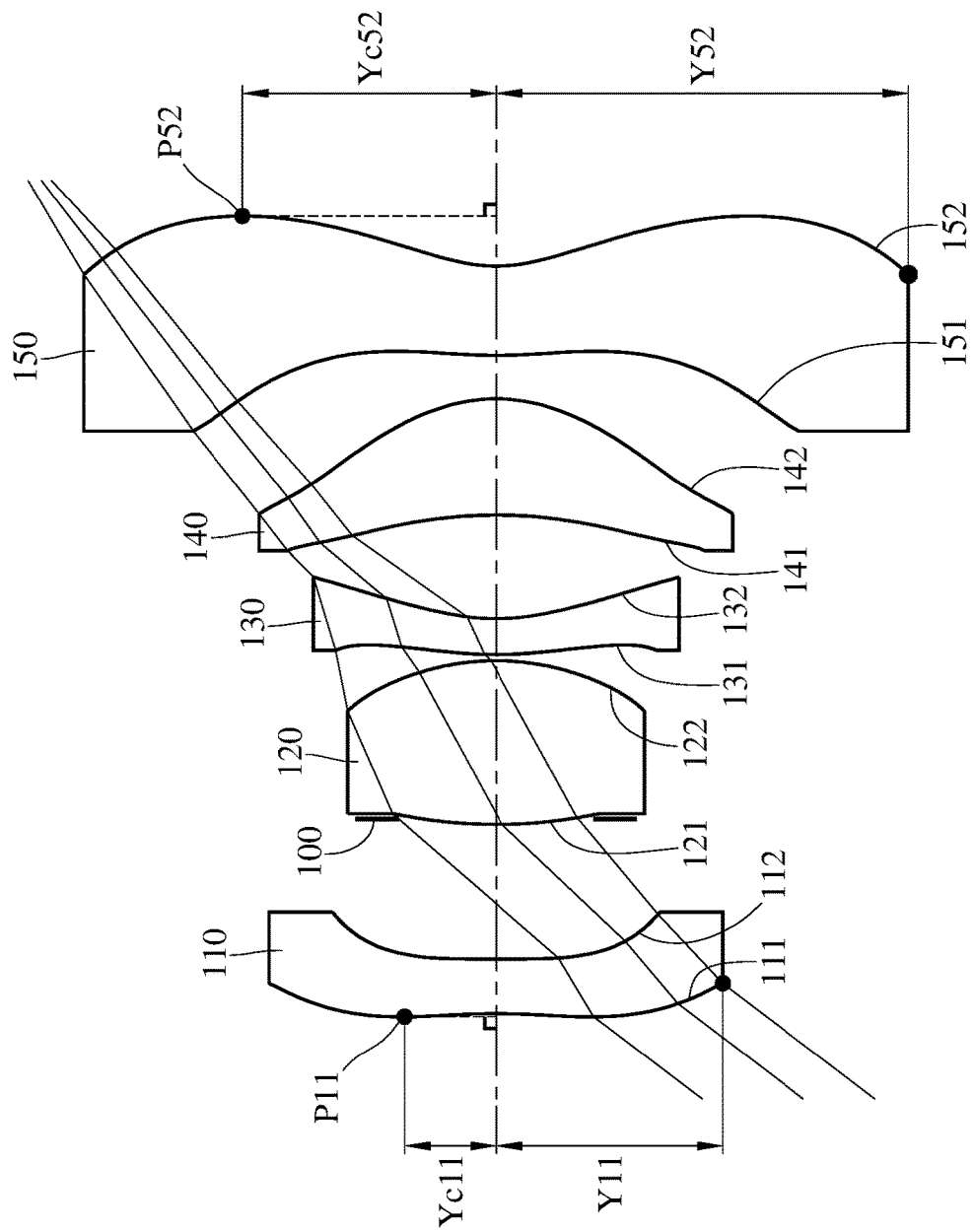
FIG. 25 shows a schematic view of Yc11, Y11, Yc52, Y52 and critical points on the first lens element and the fifth lens element, according to the 1st embodiment of the present disclosure.

The first lens element can have negative refractive power; therefore, it is favorable for providing the optical imaging lens assembly with a wide-angle configuration. The first lens element has an object-side surface being concave in a paraxial region thereof; therefore, it is favorable for the first lens element to have good light convergence capability, and also favorable for ensuring a shape of the first lens element is not overly curved, such that the first lens element is favorable for the design of wide-angle configuration. The object-side surface of the first lens element can have at least one convex critical point in an off-axial region thereof; therefore, it is favorable for correcting off-axial aberrations and reducing surface reflection of light at the off-axial region, such that it is favorable for providing the optical imaging lens assembly with a wide-angle configuration. Please refer to FIG. 25, which shows a schematic view of convex critical point P11 on the object-side surface of the first lens element according to the 1st embodiment of the present disclosure.

The second lens element has positive refractive power; therefore, it is favorable for correcting aberrations generated by the first lens element, and also favorable for the optical imaging lens assembly to have sufficient positive refractive power so as to reduce the total track length. The second lens element can have an object-side surface being convex in a paraxial region thereof; therefore, it is favorable for the second lens element to have sufficient positive refractive power. The second lens element can have an image-side surface being convex in a paraxial region thereof; therefore, it is favorable for the second lens element having sufficient positive refractive power, and minimizing surface reflection so as to increase illuminance on an image surface.

The third lens element has negative refractive power; therefore, adjusting the Petzval sum is favorable for minimizing astigmatism and field curvature of the optical imaging lens assembly. The third lens element can have an image-side surface being concave in a paraxial region thereof; therefore, it is favorable for strengthening the negative refractive power of the third lens element.

The fourth lens element has positive refractive power; therefore, it is favorable for providing the optical imaging lens assembly with light convergence capability and reducing the total track length so as to achieve compactness. The fourth lens element can have an object-side surface being concave in a paraxial region thereof; therefore, it is favorable for reducing surface reflection of light at the off-axial region so as to increase peripheral relative illuminance on the image surface, such that it is favorable for the optical imaging lens assembly to be adapted to the wide-angle configuration. The fourth lens element can have an image-side surface being convex in a paraxial region thereof; therefore, it is favorable for strengthening the positive refractive power of the fourth lens element.

The fifth lens element has negative refractive power; therefore, adjusting the Petzval sum is favorable for minimizing astigmatism and field curvature of the optical imaging lens assembly. The fifth lens element can have an image-side surface being concave in a paraxial region thereof; therefore, it is favorable for reducing the back focal length of the optical imaging lens assembly so as to achieve compactness. The image-side surface of the fifth lens element can have at least one convex critical point in an off-axial region thereof; therefore, it is favorable for correcting off-axial aberrations, and also favorable for the optical imaging lens assembly to be in compact size. Please refer to FIG. 25, which shows a schematic view of convex critical point P52 on the image-side of the fifth lens element according to the 1st embodiment of the present disclosure.

When an axial distance between the first lens element and the second lens element is T12, an axial distance between the second lens element and the third lens element is T23, an axial distance between the third lens element and the fourth lens element is T34, and an axial distance between the fourth lens element and the fifth lens element is T45, the following condition is satisfied: 0<(T23+T34+T45)/T12<2.2; therefore, a sufficient axial distance between the first lens element and the second lens element is favorable for correcting off-axial aberrations so as to enhance peripheral image sharpness and resolution on the image surface. Preferably, the following condition can be satisfied: 0.40<(T23+T34+

T45)/T12<2.0; therefore, adjusting the axial distances between each two adjacent lens elements in a proper ratio is favorable for reducing the total track length of the optical imaging lens assembly. More preferably, the following condition can be satisfied: 0.40<(T23+T34+T45)/T12<1.7.

When a focal length of the first lens element is f1, and a curvature radius of an image-side surface of the first lens element is R2, the following condition is satisfied: |f1|/R2≤0. Therefore, adjusting the shape and the focal length of the first lens element is favorable for obtaining a balance between reducing aberrations and converging light. Preferably, the following condition can be satisfied: −1.35<|f1|/R2≤0.

When an Abbe number of the first lens element is V1, an Abbe number of the third lens element is V3, and an Abbe number of the fifth lens element is V5, the following condition can be satisfied: 0.75<V1/(V3+V5)<2.5. Therefore, selecting proper materials for the lens elements of the optical imaging lens assembly is favorable for correcting chromatic aberration and enlarging the field of view.

When a central thickness of the fourth lens element is CT4, and the axial distance between the third lens element and the fourth lens element is T34, the following condition can be satisfied: 0.2<CT4/T34<7.3. Therefore, it is favorable for increasing image surface area and correcting off-axial aberrations. Preferably, the following condition can be satisfied: 0.4<CT4/T34<5.0. More preferably, the following condition can be satisfied: 0.6<CT4/T34<2.5.

When the axial distance between the first lens element and the second lens element is T12, and the axial distance between the second lens element and the third lens element is T23, the following condition can be satisfied: 1.75<T12/T23<200. Therefore, proper axial distances between each adjacent lens element among the first through the third lens elements are favorable for obtaining a balance between enlarging the field of view and correcting off-axial aberrations. Preferably, the following condition can be satisfied: 3.00<T12/T23<200. More preferably, the following condition can be satisfied: 5.00<T12/T23<100. Much more preferably, the following condition can be satisfied: 12.5<T12/T23<100.

When a central thickness of the third lens element is CT3, the central thickness of the fourth lens element is CT4, the axial distance between the second lens element and the third lens element is T23, and the axial distance between the third lens element and the fourth lens element is T34, the following condition can be satisfied: 0.46<(T23+CT3+T34)/CT4<3.0. Therefore, a proper axial distance between the second lens element and the fourth lens element is favorable for obtaining a balance between enlarging the field of view and reducing the total track length of the optical imaging lens assembly. Preferably, the following condition can be satisfied: 0.52<(T23+CT3+T34)/CT4<2.0.

When an axial distance between the object-side surface of the first lens element and an image surface is TL, and a maximum image height of the optical imaging lens assembly (half of a diagonal length of an effective photosensitive area of an image sensor) is ImgH, the following condition can be satisfied: TL/ImgH<2.0. Therefore, it is favorable for increasing image surface area and reducing the total track length.

When a maximum effective radius of the image-side surface of the fifth lens element is Y52, and a focal length of the optical imaging lens assembly is f, the following condition can be satisfied: 0.90<Y52/f<5.0. Therefore, it is favorable for obtaining a balance between minimizing the size of the optical imaging lens assembly and maintaining wide field of view. Please refer to FIG. 25, which shows a schematic view of Y52 according to the 1st embodiment of the present disclosure.

When a maximum effective radius of the object-side surface of the first lens element is Y11, and the maximum image height of the optical imaging lens assembly is ImgH, the following condition can be satisfied: 0.35<Y11/ImgH<0.85. Therefore, it is favorable for obtaining a balance between increasing image surface area and reducing the size of the optical imaging lens assembly. Please refer to FIG. 25, which shows a schematic view of Y11 according to the 1st embodiment of the present disclosure.

When a curvature radius of the object-side surface of the first lens element is R1, and the curvature radius of the image-side surface of the first lens element is R2, the following condition can be satisfied: 1.0<|R2/R1|. Therefore, adjusting the shape of the first lens element to provide the first lens element with a proper refractive power is favorable for the design of wide-angle configuration; furthermore, it is favorable for preventing the shape of the first lens element from being overly curved so as to prevent manufacturing problems, and thereby increase manufacturing yield rate.

When the curvature radius of the image-side surface of the first lens element is R2, and a curvature radius of the object-side surface of the second lens element is R3, the following condition can be satisfied: R3/R2≤0. Therefore, it is favorable for the curvatures of the first lens element and the second lens element to cooperate with each other in order to minimize off-axial aberrations. Preferably, the following condition can be satisfied: −1.1<R3/R2≤0.

When the focal length of the optical imaging lens assembly is f, and a focal length of the fourth lens element is f4, the following condition can be satisfied: 0<f/f4<1.6. Therefore, it is favorable for preventing the refractive power of the fourth lens element from being overly strong in order to maintain a wide imaging range.

When a focal length of the third lens element is f3, and a focal length of the fifth lens element is f5, the following condition can be satisfied: 0.40<f3/f5<4.75. Therefore, evenly arranging the refractive power distribution of the optical imaging lens assembly is favorable for correcting aberrations, such as field curvature, at the off-axial region. Preferably, the following condition can be satisfied: 0.75<f3/f5<4.25.

When the curvature radius of the object-side surface of the second lens element is R3, and a curvature radius of the image-side surface of the second lens element is R4, the following condition can be satisfied: 1.0<|R3/R4|; therefore, it is favorable for reducing surface reflection of light at the off-axial region so as to increase peripheral relative illuminance on the image surface. Preferably, the following condition can be satisfied: 1.0<|R3/R4|<35; therefore, it is favorable for preventing a shape of the second lens element from being overly curved so as to prevent manufacturing problems, and thereby increase manufacturing yield rate.

When a vertical distance between a non-axial critical point on the object-side surface of the first lens element and an optical axis is Yc11, and a vertical distance between a non-axial critical point on the image-side surface of the fifth lens element and the optical axis is Yc52, the following condition can be satisfied: 0.1<Yc11/Yc52<1.0. Therefore, adjusting the shapes of the first lens element and the fifth lens element is favorable for correcting off-axial aberrations. Please refer to FIG. 25, which shows a schematic view of Yc11 and Yc52 according to the 1st embodiment of the present disclosure.

According to the present disclosure, the optical imaging lens assembly can further include an aperture stop which can be located between the first lens element and the second lens element. Therefore, it is favorable for obtaining a balance between enlarging the field of view and reducing the size of the optical imaging lens assembly.

When an f-number of the optical imaging lens assembly is Fno, the following condition can be satisfied: 1.5<Fno<2.8. Therefore, adjusting the size of the aperture stop is favorable for providing proper brightness on the image surface.

When half of a maximum field of view of the optical imaging lens assembly is HFOV, the following condition can be satisfied: 45 [deg.]<HFOV<80 [deg.]. Therefore, it is favorable for the optical imaging lens assembly to obtain wide angle effect.

Figure 26:
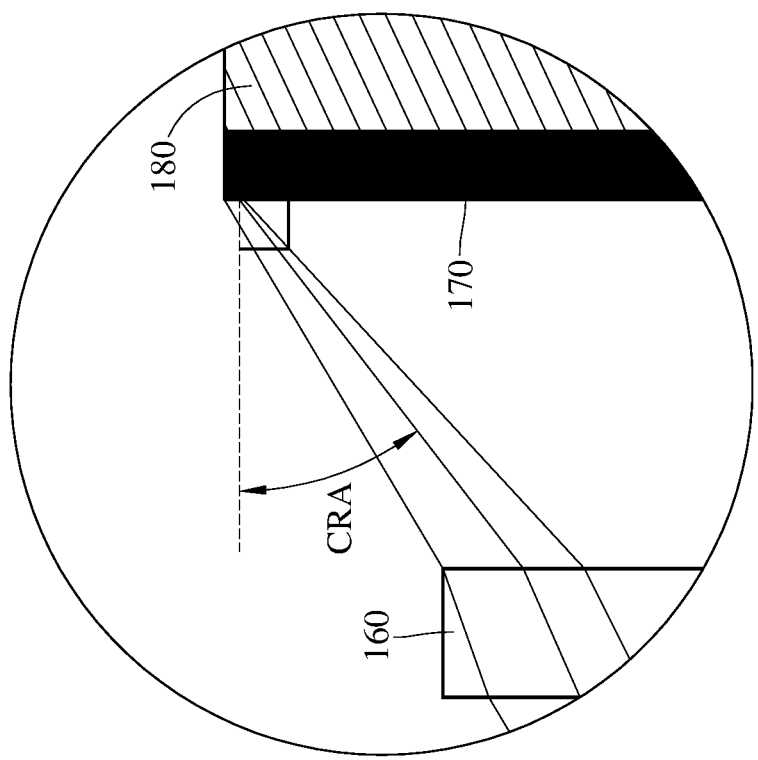
FIG. 26 shows a schematic view of CRA according to the 1st embodiment of the present disclosure.

When a maximum chief ray angle of the optical imaging lens assembly is CRA, the following condition can be satisfied: 30 [deg.]<CRA<60 [deg.]. Therefore, controlling the angle of incidence on the image sensor is favorable for improving the response efficiency of the image sensor; thus, it is favorable for improving the image quality, and also favorable for obtaining a balance between high image quality and wide field of view. Please refer to FIG. 26, which shows a schematic view of CRA according to the 1st embodiment of the present disclosure, wherein a chief ray is projected on the image surface 170 at the maximum image height, and the angle between a normal line of the image surface 170 and the chief ray is CRA.

According to the present disclosure, the lens elements thereof can be made of glass or plastic material. When the lens elements are made of glass material, the distribution of the refractive power of the lens system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the lens system can also be reduced.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, a critical point is a non-axial point of the lens surface where its tangent is perpendicular to the optical axis.

According to the present disclosure, an image surface of the optical imaging lens assembly, based on the corresponding image sensor, can be flat or curved, especially a curved surface being concave facing towards the object side of the optical imaging lens assembly. Furthermore, an image correction unit, such as a field flattener, can be optionally disposed between the lens element closest to the image-side of the optical imaging lens system and the image surface for correction of aberrations such as field curvature. The optical properties of the image correction unit, such as curvature, thickness, index of refraction, position and surface shape (convex or concave surface with spherical, aspheric, diffraction or Fresnel morphology), can be adjusted according to the demand of an image capturing unit. In general, a preferable image correction unit is, for example, a thin element having a concave object-side surface and a planar image-side surface, and the thin element is disposed near the image surface.

According to the present disclosure, the optical imaging lens assembly can include at least one stop, such as an aperture stop, a glare stop or a field stop. Said glare stop or said field stop is set for eliminating the stray light and thereby improving the image quality thereof.

According to the present disclosure, an aperture stop can be configured as a front stop or a middle stop. A front stop disposed between an imaged object and the first lens element can provide a longer distance between an exit pupil of the lens system and the image surface to produce a telecentric effect, and thereby improves the image-sensing efficiency of an image sensor (for example, CCD or CMOS). A middle stop disposed between the first lens element and the image surface is favorable for enlarging the view angle of the optical imaging lens assembly and thereby provides a wider field of view for the same.

According to the above description of the present disclosure, the following specific embodiments are provided for further explanation.

1st Embodiment

Figure 1:
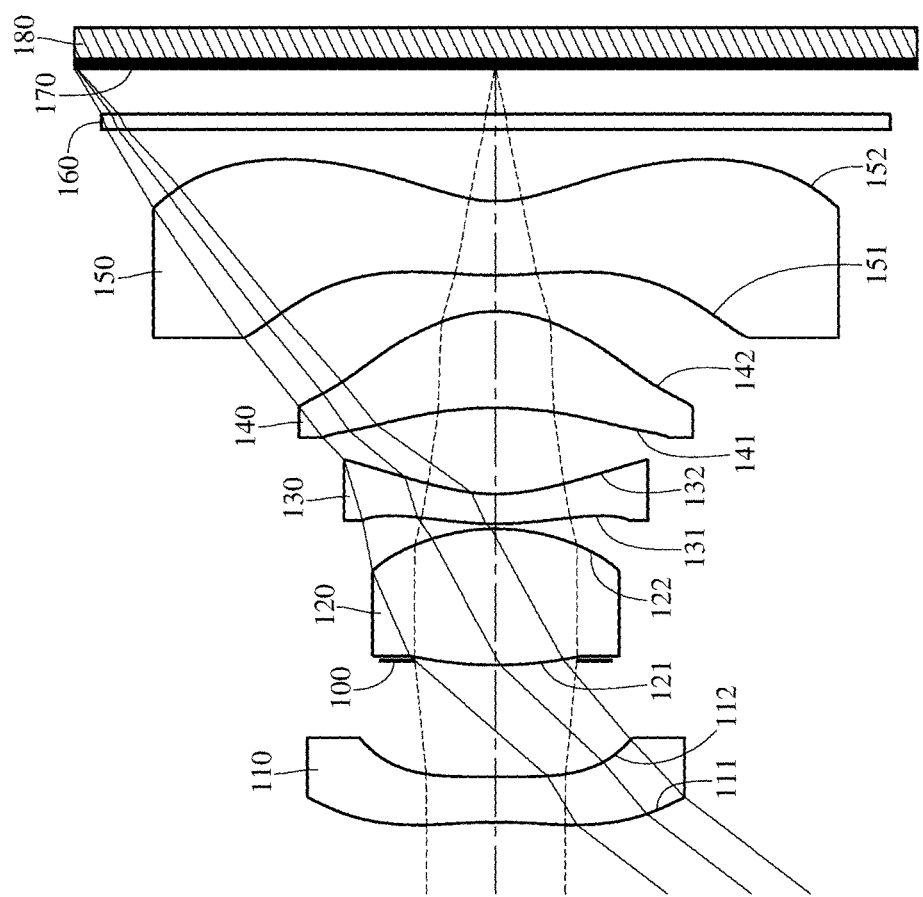
FIG. 1 is a schematic view of an image capturing unit according to the 1st embodiment of the present disclosure.
Figure 2:
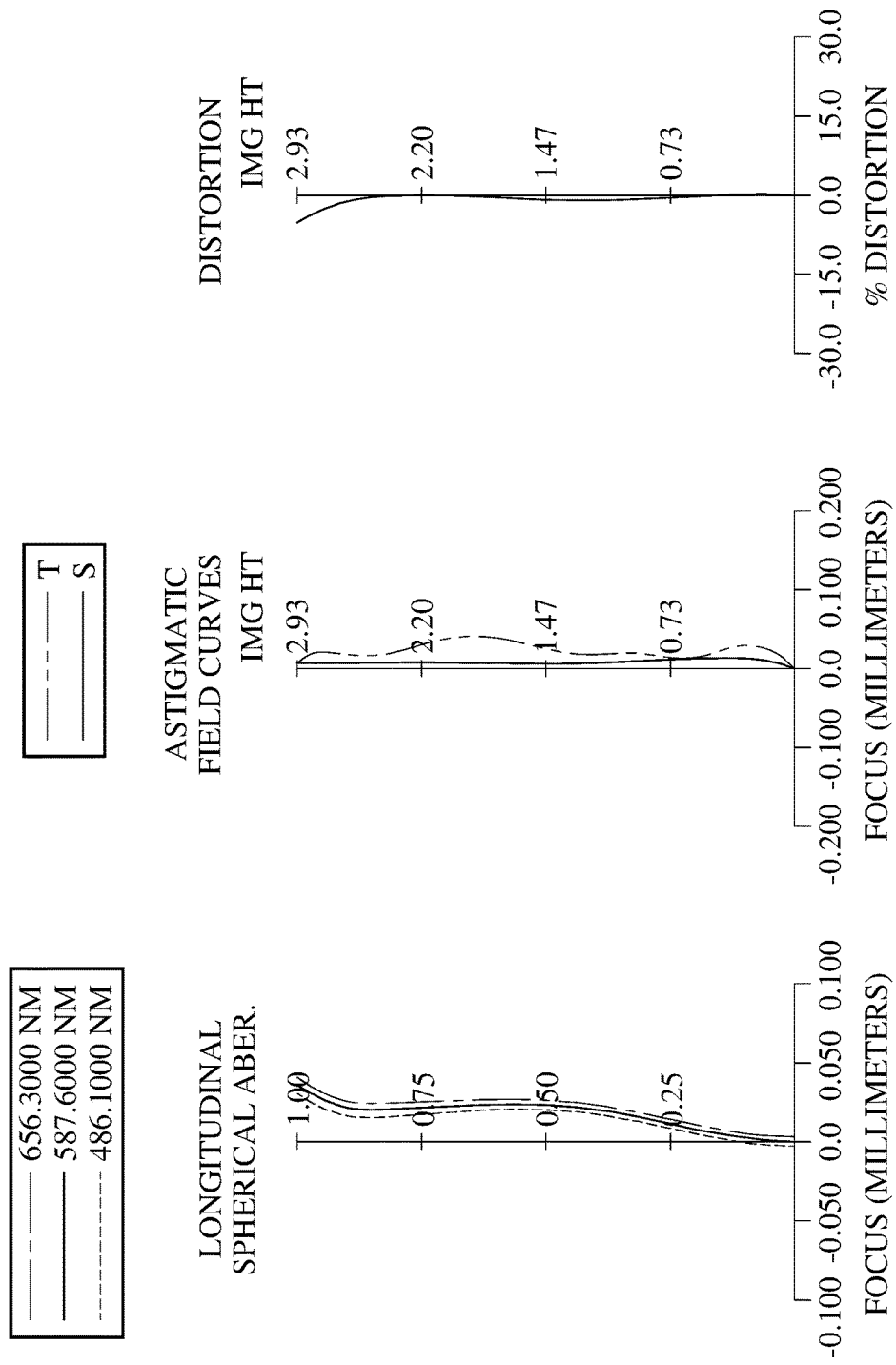
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging lens assembly (its reference numeral is omitted) of the present disclosure and an image sensor 180. The optical imaging lens assembly includes, in order from an object side to an image side, a first lens element 110, an aperture stop 100, a second lens element 120, a third lens element 130, a fourth lens element 140, a fifth lens element 150, an IR-cut filter 160 and an image surface 170. The optical imaging lens assembly includes five lens elements (110, 120, 130, 140 and 150) with no additional lens element disposed between the first lens element 110 and the fifth lens element 150.

The first lens element 110 with negative refractive power has an object-side surface 111 being concave in a paraxial region thereof and an image-side surface 112 being planar in a paraxial region thereof. The first lens element 110 is made of plastic material and has the object-side surface 111 and the image-side surface 112 being both aspheric. The object-side surface 111 of the first lens element 110 has at least one convex critical point in an off-axial region thereof.

The second lens element 120 with positive refractive power has an object-side surface 121 being convex in a paraxial region thereof and an image-side surface 122 being convex in a paraxial region thereof. The second lens element 120 is made of plastic material and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being convex in a paraxial region thereof and an image-side surface 152 being concave in a paraxial region thereof. The fifth lens element 150 is made of plastic material and has the object-side surface 151 and the image-side surface 152 being both aspheric. The image-side surface 152 of the fifth lens element 150 has at least one convex critical point in an off-axial region thereof.

The IR-cut filter 160 is made of glass and located between the fifth lens element 150 and the image surface 170, and will not affect the focal length of the optical imaging lens assembly. The image sensor 180 is disposed on or near the image surface 170 of the optical imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical imaging lens assembly of the image capturing unit according to the 1st embodiment, when a focal length of the optical imaging lens assembly is f, an f-number of the optical imaging lens assembly is Fno, and half of a maximum field of view of the optical imaging lens assembly is HFOV, these parameters have the following values: f=2.35 millimeters (mm), Fno=2.42, HFOV=52.6 degrees (deg.).

When an Abbe number of the first lens element 110 is V1, an Abbe number of the third lens element 130 is V3, and an Abbe number of the fifth lens element 150 is V5, the following condition is satisfied: V1/(V3+V5)=1.21.

When a central thickness of the fourth lens element 140 is CT4, and an axial distance between the third lens element 130 and the fourth lens element 140 is T34, the following condition is satisfied: CT4/T34=1.12. In this embodiment, the axial distance between two adjacent lens elements is the air gap in a paraxial region between the two adjacent lens elements.

When an axial distance between the first lens element 110 and the second lens element 120 is T12, and an axial distance between the second lens element 120 and the third lens element 130 is T23, the following condition is satisfied: T12/T23=22.34.

When the axial distance between the second lens element 120 and the third lens element 130 is T23, the axial distance between the third lens element 130 and the fourth lens element 140 is T34, a central thickness of the third lens element 130 is CT3, and the central thickness of the fourth lens element 140 is CT4, the following condition is satisfied: (T23+CT3+T34)/CT4=1.25.

When the axial distance between the first lens element 110 and the second lens element 120 is T12, the axial distance between the second lens element 120 and the third lens element 130 is T23, the axial distance between the third lens element 130 and the fourth lens element 140 is T34, and an axial distance between the fourth lens element 140 and the fifth lens element 150 is T45, the following condition is satisfied: (T23+T34+T45)/T12=1.14.

When a curvature radius of the object-side surface 111 of the first lens element 110 is R1, and a curvature radius of the image-side surface 112 of the first lens element 110 is R2, the following condition is satisfied: |R2/R1|=∞ (infinity).

When the curvature radius of the image-side surface 112 of the first lens element 110 is R2, and a curvature radius of the object-side surface 121 of the second lens element 120 is R3, the following condition is satisfied: R3/R2=0.00.

When the curvature radius of the object-side surface 121 of the second lens element 120 is R3, and a curvature radius of the image-side surface 122 of the second lens element 120 is R4, the following condition is satisfied: |R3/R4|=2.01.

When the focal length of the optical imaging lens assembly is f, and a focal length of the fourth lens element 140 is f4, the following condition is satisfied: f/f4=0.96.

When a focal length of the first lens element 110 is f1, and the curvature radius of the image-side surface 112 of the first lens element 110 is R2, the following condition is satisfied: |f1|/R2=0.00.

When a focal length of the third lens element 130 is f3, and a focal length of the fifth lens element 150 is f5, the following condition is satisfied: f3/f5=2.15.

When a maximum chief ray angle of the optical imaging lens assembly is CRA, the following condition is satisfied: CRA=37.57 degrees.

When an axial distance between the object-side surface 111 of the first lens element 110 and the image surface 170 is TL, and a maximum image height of the optical imaging lens assembly is ImgH, the following condition is satisfied: TL/ImgH=1.80.

When a maximum effective radius of the object-side surface 111 of the first lens element 110 is Y11, and the maximum image height of the optical imaging lens assembly is ImgH, the following condition is satisfied: Y11/ImgH=0.45.

When a maximum effective radius of the image-side surface 152 of the fifth lens element 150 is Y52, and the focal length of the optical imaging lens assembly is f, the following condition is satisfied: Y52/f=1.02.

When a vertical distance between a non-axial critical point on the object-side surface 111 of the first lens element 110 and the optical axis is Yc11, and a vertical distance between a non-axial critical point on the image-side surface 152 of the fifth lens element 150 and the optical axis is Yc52, the following condition is satisfied: Yc11/Yc52=0.37.

The detailed optical data of the 1st embodiment are shown in Table 1 and the aspheric surface data are shown in Table 2 below.

TABLE 1

1st Embodiment
f = 2.35 mm, Fno = 2.42, HFOV = 52.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.744 | (ASP) | 0.317 | Plastic | 1.545 | 56.0 | −6.87 |
| 2 | | ∞ | (ASP) | 0.813 | | | | |
| 3 | Ape. Stop | Plano | | −0.031 | | | | |
| 4 | Lens 2 | 2.836 | (ASP) | 0.957 | Plastic | 1.544 | 56.0 | 1.88 |
| 5 | | −1.408 | (ASP) | 0.035 | | | | |
| 6 | Lens 3 | 2.324 | (ASP) | 0.208 | Plastic | 1.660 | 20.4 | −4.95 |
| 7 | | 1.309 | (ASP) | 0.603 | | | | |
| 8 | Lens 4 | −2.573 | (ASP) | 0.678 | Plastic | 1.544 | 56.0 | 2.46 |
| 9 | | −0.963 | (ASP) | 0.253 | | | | |
| 10 | Lens 5 | 2.791 | (ASP) | 0.518 | Plastic | 1.614 | 26.0 | −2.30 |
| 11 | | 0.870 | (ASP) | 0.500 | | | | |
| 12 | IR-cut filter | Plano | | 0.110 | Glass | 1.517 | 64.2 | — |
| 13 | | Plano | | 0.315 | | | | |
| 14 | Image | Plano | | — | | | | |

Note:
Reference wavelength is 587.6 nm (d-line).
An effective radius of the object-side surface 111 (Surface 1) is 1.318 mm.

TABLE 2

Aspheric Coefficients

| Surface # | 1 | 2 | 4 | 5 | 6 |
|---|---|---|---|---|---|
| k = | 2.1708E+00 | −9.0000E+01 | −5.1004E+01 | −1.0043E+00 | 2.1557E+00 |
| A4 = | 3.0262E−01 | 3.7915E−01 | 2.7078E−01 | 7.0805E−02 | −2.9314E−01 |
| A6 = | −2.1655E−01 | −1.7021E−01 | −6.0542E−01 | −3.3054E−01 | 8.6614E−02 |
| A8 = | 1.4663E−01 | 1.3242E−01 | 8.6023E−01 | 6.8644E−01 | 2.4265E−01 |
| A10 = | −6.4036E−02 | −5.2829E−02 | −6.1089E−01 | −8.6665E−01 | −7.9007E−01 |
| A12 = | 1.5211E−02 | 1.4799E−01 | −3.3892E−01 | 3.1945E−01 | 8.4712E−01 |
| A14 = | −1.7199E−03 | −1.0437E−01 | — | — | −3.8143E−01 |

| Surface # | 7 | 8 | 9 | 10 | 11 |
|---|---|---|---|---|---|
| k = | −1.3943E+00 | 2.4823E+00 | −1.2567E+00 | −9.0000E+01 | −6.0733E+00 |
| A4 = | −3.3125E−01 | 9.9953E−02 | 7.9311E−02 | −1.1726E−01 | −9.4628E−02 |
| A6 = | 4.6043E−01 | −2.1702E−01 | −4.8876E−02 | −2.8947E−02 | 4.2183E−02 |
| A8 = | −5.1962E−01 | 3.3594E−01 | −1.3484E−01 | 8.5574E−02 | −1.3023E−02 |
| A10 = | 3.9193E−01 | −9.8778E−02 | 2.8458E−01 | −6.0654E−02 | 2.3495E−03 |
| A12 = | −1.6811E−01 | −1.4036E−01 | −1.8456E−01 | 2.0489E−02 | −2.2114E−04 |
| A14 = | 2.8977E−02 | 1.2538E−01 | 5.1294E−02 | −3.2760E−03 | 6.0509E−06 |
| A16 = | — | −3.1301E−02 | −5.4937E−03 | 1.9728E−04 | 2.9900E−07 |

In Table 1, the curvature radius, the thickness and the focal length are shown in millimeters (mm). Surface numbers 0-14 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
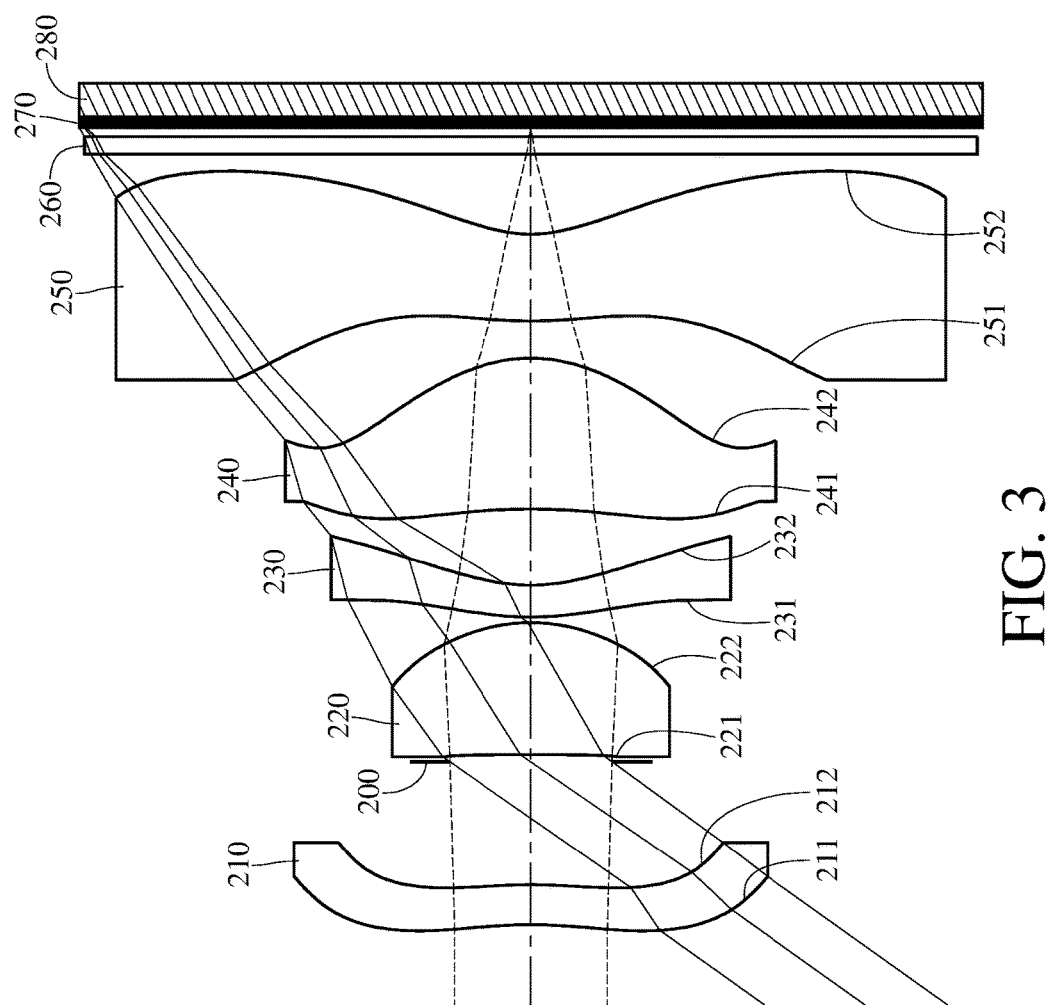
FIG. 3 is a schematic view of an image capturing unit according to the 2nd embodiment of the present disclosure.
Figure 4:
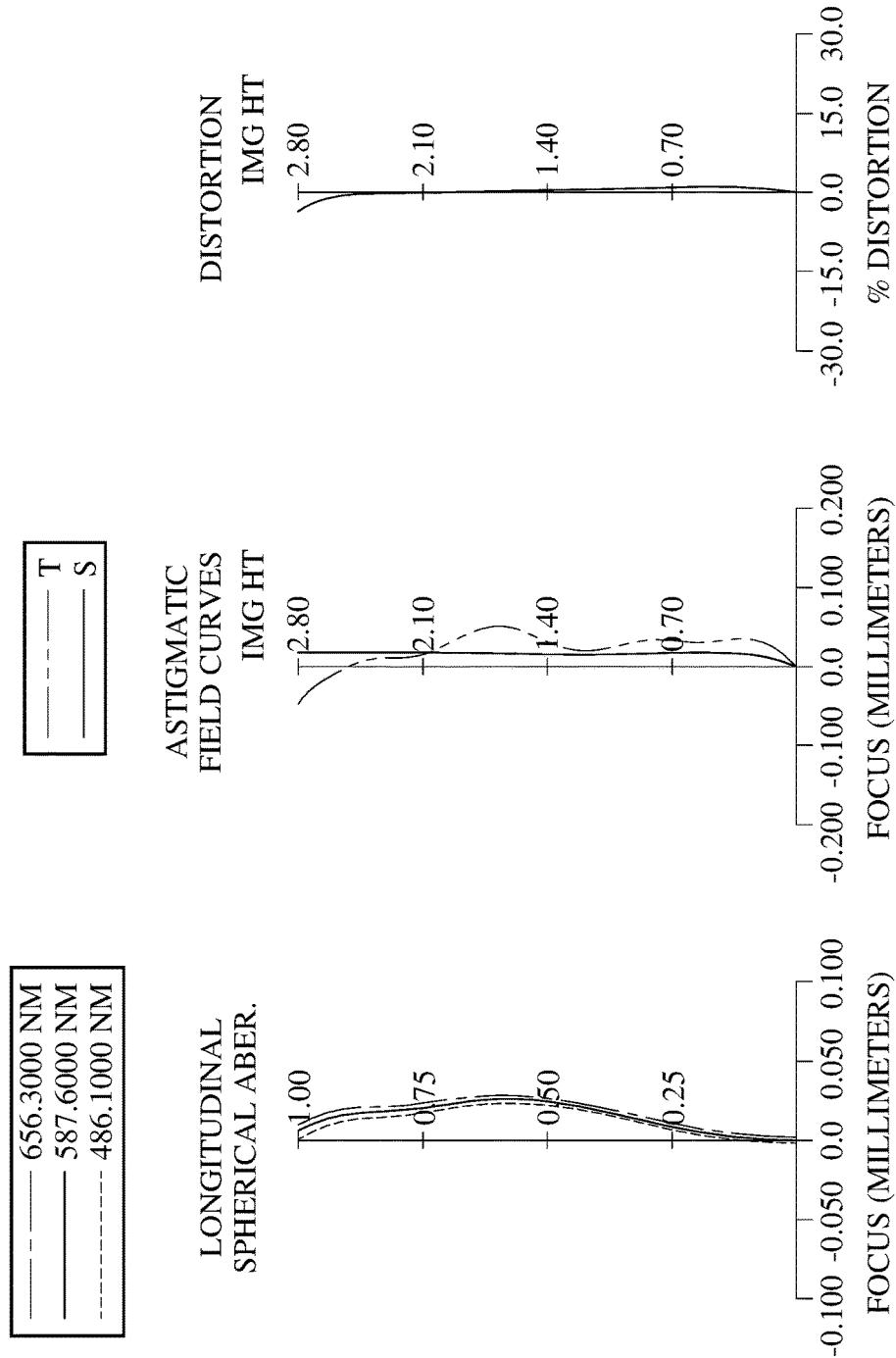
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging lens assembly (its reference numeral is omitted) of the present disclosure and an image sensor 280. The optical imaging lens assembly includes, in order from an object side to an image side, a first lens element 210, an aperture stop 200, a second lens element 220, a third lens element 230, a fourth lens element 240, a fifth lens element 250, an IR-cut filter 260 and an image surface 270. The optical imaging lens assembly includes five lens elements (210, 220, 230, 240 and 250) with no additional lens element disposed between the first lens element 210 and the fifth lens element 250.

The first lens element 210 with negative refractive power has an object-side surface 211 being concave in a paraxial region thereof and an image-side surface 212 being convex in a paraxial region thereof. The first lens element 210 is made of plastic material and has the object-side surface 211 and the image-side surface 212 being both aspheric. The object-side surface 211 of the first lens element 210 has at least one convex critical point in an off-axial region thereof.

The second lens element 220 with positive refractive power has an object-side surface 221 being concave in a paraxial region thereof and an image-side surface 222 being convex in a paraxial region thereof. The second lens element 220 is made of plastic material and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of plastic material and has the object-side surface 231 and the image-side surface 232 being both aspheric.

The fourth lens element 240 with positive refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric. The image-side surface 252 of the fifth lens element 250 has at least one convex critical point in an off-axial region thereof.

The IR-cut filter 260 is made of glass and located between the fifth lens element 250 and the image surface 270, and will not affect the focal length of the optical imaging lens assembly. The image sensor 280 is disposed on or near the image surface 270 of the optical imaging lens assembly.

The detailed optical data of the 2nd embodiment are shown in Table 3 and the aspheric surface data are shown in Table 4 below.

TABLE 3

2nd Embodiment
f = 2.06 mm, Fno = 2.15, HFOV = 54.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.763 | (ASP) | 0.250 | Plastic | 1.523 | 52.3 | −29.92 |
| 2 | | −3.459 | (ASP) | 0.774 | | | | |
| 3 | Ape. Stop | Plano | | 0.045 | | | | |
| 4 | Lens 2 | −196.078 | (ASP) | 0.827 | Plastic | 1.544 | 56.0 | 2.01 |
| 5 | | −1.089 | (ASP) | 0.035 | | | | |
| 6 | Lens 3 | 1.873 | (ASP) | 0.200 | Plastic | 1.671 | 19.5 | −5.15 |
| 7 | | 1.163 | (ASP) | 0.481 | | | | |
| 8 | Lens 4 | −3.537 | (ASP) | 0.945 | Plastic | 1.523 | 52.3 | 2.25 |
| 9 | | −0.964 | (ASP) | 0.232 | | | | |
| 10 | Lens 5 | 2.472 | (ASP) | 0.549 | Plastic | 1.671 | 19.5 | −2.24 |
| 11 | | 0.851 | (ASP) | 0.500 | | | | |
| 12 | IR-cut filter | Plano | | 0.110 | Glass | 1.517 | 64.2 | — |
| 13 | | Plano | | 0.056 | | | | |
| 14 | Image | Plano | | — | | | | |

Note:
Reference wavelength is 587.6 nm (d-line).

TABLE 4

Aspheric Coefficients

| Surface # | 1 | 2 | 4 | 5 | 6 |
|---|---|---|---|---|---|
| k = | −1.3517E+00 | 6.0888E+00 | 9.0000E+01 | −1.0066E+00 | 1.0440E+00 |
| A4 = | 2.8880E−01 | 3.6984E−01 | −7.5996E−02 | 7.7279E−02 | −3.2864E−01 |
| A6 = | −2.4258E−01 | −3.5596E−01 | −5.0373E−01 | −5.2128E−01 | 1.5083E−01 |
| A8 = | 2.0669E−01 | 5.0688E−01 | 2.9948E+00 | 1.4049E+00 | 2.6908E−01 |
| A10 = | −1.1755E−01 | −4.8780E−01 | −1.1476E+01 | −2.2675E+00 | −7.3781E−01 |
| A12 = | 3.9922E−02 | 2.8857E−01 | 1.5245E+01 | 1.2245E+00 | 5.7993E−01 |
| A14 = | −5.7489E−03 | −6.8152E−02 | — | — | −1.5309E−01 |

| Surface # | 7 | 8 | 9 | 10 | 11 |
|---|---|---|---|---|---|
| k = | −1.5460E+00 | −3.7223E+00 | −1.3498E+00 | −6.1709E+01 | −5.1855E+00 |
| A4 = | −3.6925E−01 | 1.0651E−01 | 2.9120E−02 | −1.0197E−01 | −8.0200E−02 |
| A6 = | 4.7203E−01 | −1.5449E−01 | 5.5096E−02 | −5.8935E−02 | 3.0199E−02 |
| A8 = | −3.7995E−01 | 2.6064E−01 | −1.6470E−01 | 1.0248E−01 | −6.0165E−03 |
| A10 = | 1.3577E−01 | −1.9296E−01 | 2.0131E−01 | −5.7757E−02 | 4.1242E−04 |
| A12 = | −1.8141E−03 | 6.6360E−02 | −9.8933E−02 | 1.6512E−02 | 4.6884E−05 |
| A14 = | −6.7134E−03 | −8.4822E−03 | 2.1557E−02 | −2.3623E−03 | −9.3638E−06 |
| A16 = | — | −1.7891E−04 | −1.7652E−03 | 1.3309E−04 | 4.1012E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.06 | |R3/R4| | 179.98 |
| Fno | 2.15 | f/f4 | 0.92 |
| HFOV [deg.] | 54.5 | |f1|/R2 | −8.65 |
| V1/(V3 + V5) | 1.34 | f3/f5 | 2.30 |
| CT4/T34 | 1.96 | CRA [deg.] | 38.83 |
| T12/T23 | 23.40 | TL/ImgH | 1.79 |
| (T23 + CT3 + T34)/CT4 | 0.76 | Y11/ImgH | 0.53 |
| (T23 + T34 + T45)/T12 | 0.91 | Y52/f | 1.26 |
| |R2/R1| | 1.25 | Yc11/Yc52 | 0.37 |
| R3/R2 | 56.68 | — | — |

3rd Embodiment

Figure 5:
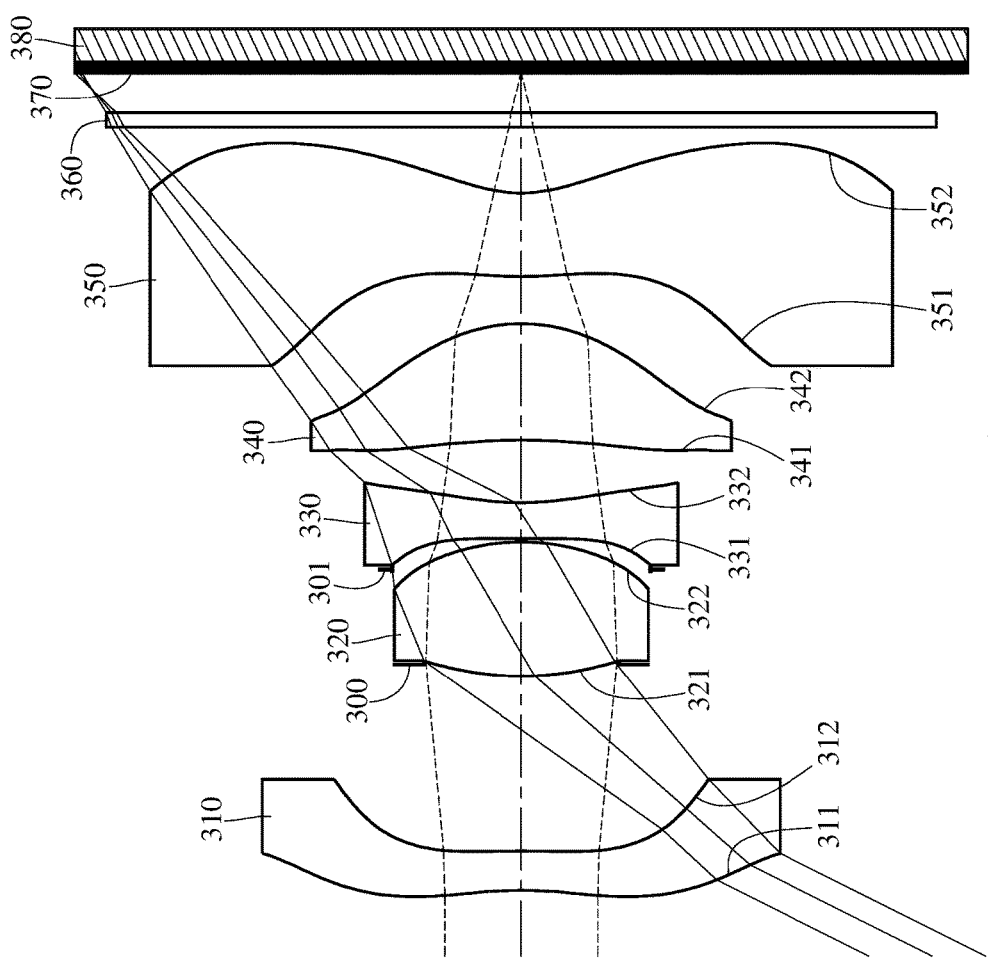
FIG. 5 is a schematic view of an image capturing unit according to the 3rd embodiment of the present disclosure.
Figure 6:
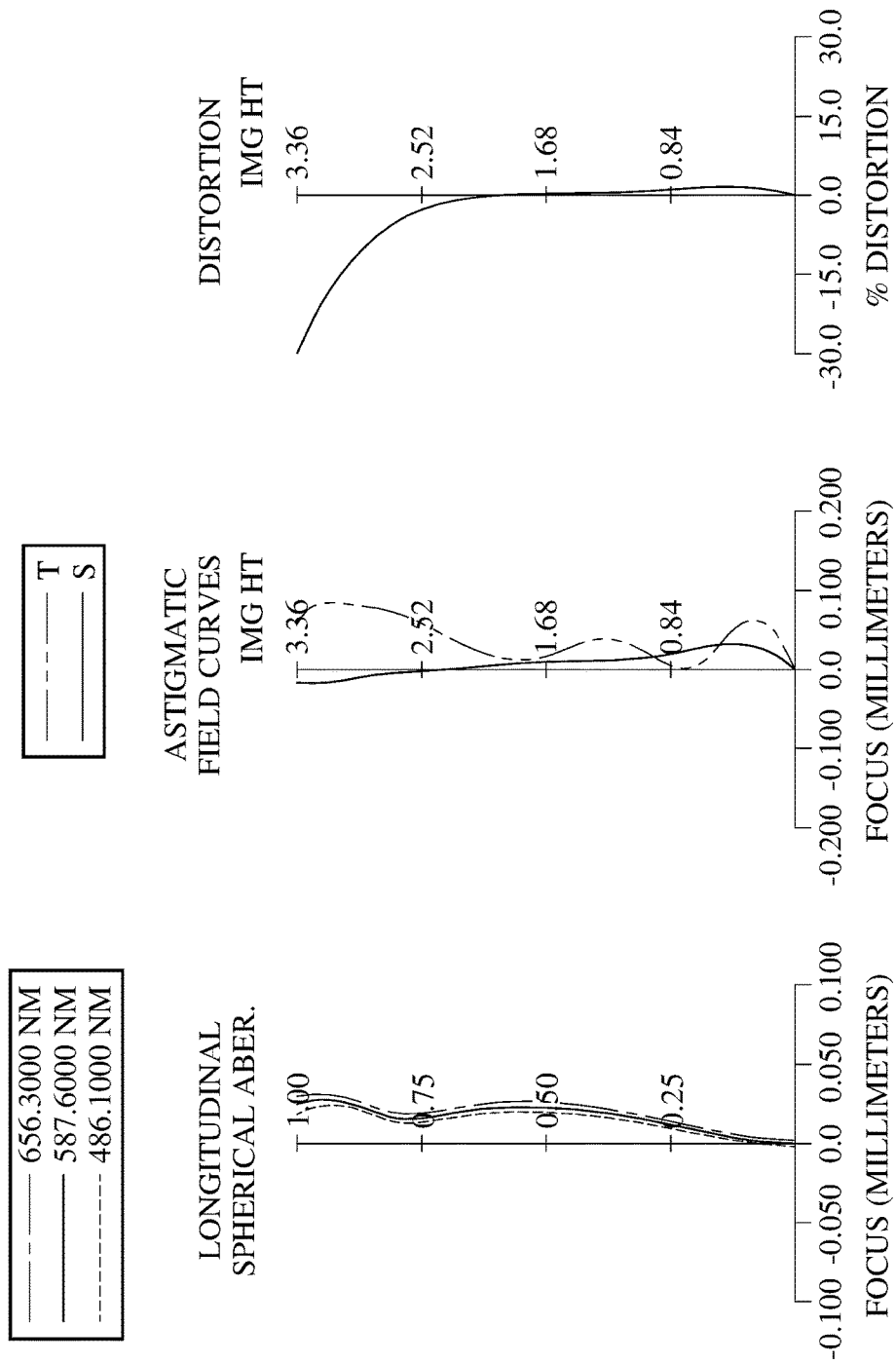
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging lens assembly (its reference numeral is omitted) of the present disclosure and an image sensor 380. The optical imaging lens assembly includes, in order from an object side to an image side, a first lens element 310, an aperture stop 300, a second lens element 320, a stop 301, a third lens element 330, a fourth lens element 340, a fifth lens element 350, an IR-cut filter 360 and an image surface 370. The optical imaging lens assembly includes five lens elements (310, 320, 330, 340 and 350) with no additional lens element disposed between the first lens element 310 and the fifth lens element 350.

The first lens element 310 with negative refractive power has an object-side surface 311 being concave in a paraxial region thereof and an image-side surface 312 being convex in a paraxial region thereof. The first lens element 310 is made of plastic material and has the object-side surface 311 and the image-side surface 312 being both aspheric. The object-side surface 311 of the first lens element 310 has at least one convex critical point in an off-axial region thereof.

The second lens element 320 with positive refractive power has an object-side surface 321 being convex in a paraxial region thereof and an image-side surface 322 being convex in a paraxial region thereof. The second lens element 320 is made of plastic material and has the object-side surface 321 and the image-side surface 322 being both aspheric.

The third lens element 330 with negative refractive power has an object-side surface 331 being concave in a paraxial region thereof and an image-side surface 332 being concave in a paraxial region thereof. The third lens element 330 is made of plastic material and has the object-side surface 331 and the image-side surface 332 being both aspheric.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric. The image-side surface 352 of the fifth lens element 350 has at least one convex critical point in an off-axial region thereof.

The IR-cut filter 360 is made of glass and located between the fifth lens element 350 and the image surface 370, and will not affect the focal length of the optical imaging lens assembly. The image sensor 380 is disposed on or near the image surface 370 of the optical imaging lens assembly.

The detailed optical data of the 3rd embodiment are shown in Table 5 and the aspheric surface data are shown in Table 6 below.

TABLE 5

3rd Embodiment
f = 2.39 mm, Fno = 2.05, HFOV = 63.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.781 | (ASP) | 0.297 | Plastic | 1.545 | 56.0 | −7.48 |
| 2 | | −9.106 | (ASP) | 1.421 | | | | |
| 3 | Ape. Stop | Plano | | −0.091 | | | | |
| 4 | Lens 2 | 2.328 | (ASP) | 1.021 | Plastic | 1.544 | 56.0 | 1.89 |
| 5 | | −1.559 | (ASP) | −0.209 | | | | |
| 6 | Stop | Plano | | 0.235 | | | | |
| 7 | Lens 3 | −181.818 | (ASP) | 0.272 | Plastic | 1.614 | 26.0 | −3.60 |
| 8 | | 2.238 | (ASP) | 0.473 | | | | |
| 9 | Lens 4 | −5.502 | (ASP) | 0.890 | Plastic | 1.544 | 56.0 | 2.87 |
| 10 | | −1.285 | (ASP) | 0.358 | | | | |
| 11 | Lens 5 | 2.821 | (ASP) | 0.633 | Plastic | 1.614 | 26.0 | −2.93 |
| 12 | | 1.005 | (ASP) | 0.500 | | | | |

TABLE 5-continued

3rd Embodiment
f = 2.39 mm, Fno = 2.05, HFOV = 63.4 deg.

| Surface # | | Curvature Radius | Thickness | Material | Index | Abbe # | Focal Length |
|---|---|---|---|---|---|---|---|
| 13 | IR-cut filter | Plano | 0.110 | Glass | 1.517 | 64.2 | — |
| 14 | | Plano | 0.306 | | | | |
| 15 | Image | Plano | — | | | | |

Note:
Reference wavelength is 587.6 nm (d-line).
An effective radius of the stop 301 (Surface 6) is 0.980 mm.

TABLE 6

Aspheric Coefficients

| Surface # | 1 | 2 | 4 | 5 | 7 |
|---|---|---|---|---|---|
| k = | −2.7426E−01 | 3.3808E+01 | −3.1387E+01 | −1.4847E+00 | 9.0000E+01 |
| A4 = | 2.6848E+00 | 7.4674E−01 | 3.0295E−01 | 2.0020E−01 | −4.6311E−02 |
| A6 = | −4.5535E+00 | 2.1846E−01 | −6.6933E−01 | −9.1698E−01 | −5.6071E−01 |
| A8 = | 6.1302E+00 | −1.7479E+00 | 1.2283E+00 | 1.6545E+00 | 8.5950E−01 |
| A10 = | −5.1121E+00 | 3.0426E+00 | −1.4841E+00 | −1.6109E+00 | −4.3948E−01 |
| A12 = | 2.1527E+00 | −2.1390E+00 | 6.9243E−01 | 5.8086E−01 | −3.6311E−01 |
| A14 = | −3.5143E−01 | 5.2274E−01 | — | — | 3.3944E−01 |

| Surface # | 8 | 9 | 10 | 11 | 12 |
|---|---|---|---|---|---|
| k = | −5.8923E−01 | 6.7983E+00 | −9.4056E−01 | −9.0000E+01 | −5.5591E+00 |
| A4 = | −1.9815E−01 | 9.7079E−03 | −3.1232E−02 | −1.2923E−01 | −6.2202E−02 |
| A6 = | 1.7548E−01 | −6.6138E−03 | 5.8899E−02 | −5.8495E−02 | 2.3362E−02 |
| A8 = | −1.6577E−01 | 5.2221E−02 | −4.7193E−02 | 5.0465E−02 | −6.1645E−03 |
| A10 = | 1.2480E−01 | −3.4128E−02 | 2.1388E−02 | −3.8375E−02 | 1.0309E−03 |
| A12 = | −5.7917E−02 | 2.2831E−03 | 1.5833E−03 | 1.3217E−02 | −1.0649E−04 |
| A14 = | 1.2979E−02 | 4.5713E−03 | −2.7113E−03 | −2.1044E−03 | 5.9801E−06 |
| A16 = | — | −1.2491E−03 | 3.6436E−04 | 1.2564E−04 | −1.3423E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.39 | |R3/R4| | 1.49 |
| Fno | 2.05 | f/f4 | 0.83 |
| HFOV [deg.] | 63.4 | |f1|/R2 | −0.82 |
| V1/(V3 + V5) | 1.08 | f3/f5 | 1.23 |
| CT4/T34 | 1.88 | CRA [deg.] | 38.86 |
| T12/T23 | 51.15 | TL/ImgH | 1.85 |
| (T23 + CT3 + T34)/CT4 | 0.87 | Y11/ImgH | 0.58 |
| (T23 + T34 + T45)/T12 | 0.64 | Y52/f | 1.18 |
| |R2/R1| | 3.27 | Yc11/Yc52 | 0.44 |
| R3/R2 | −0.26 | — | — |

4th Embodiment

Figure 7:
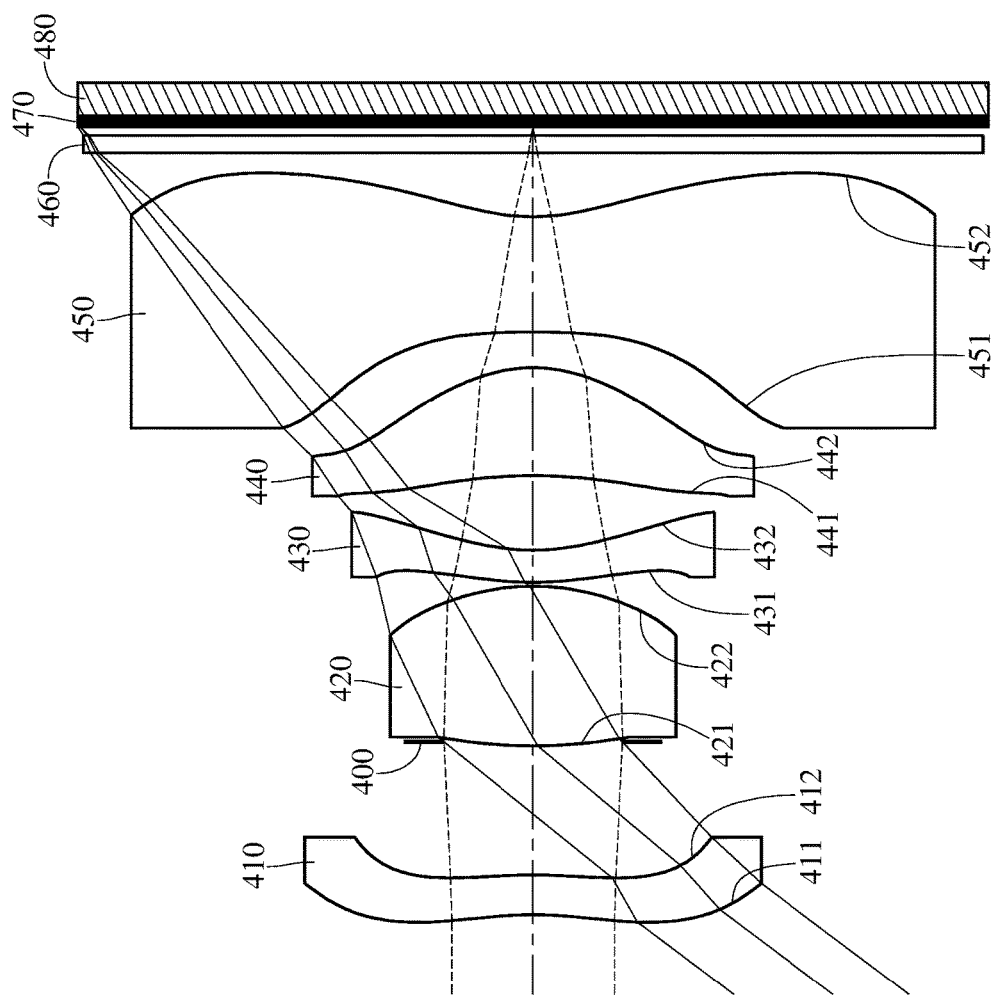
FIG. 7 is a schematic view of an image capturing unit according to the 4th embodiment of the present disclosure.
Figure 8:
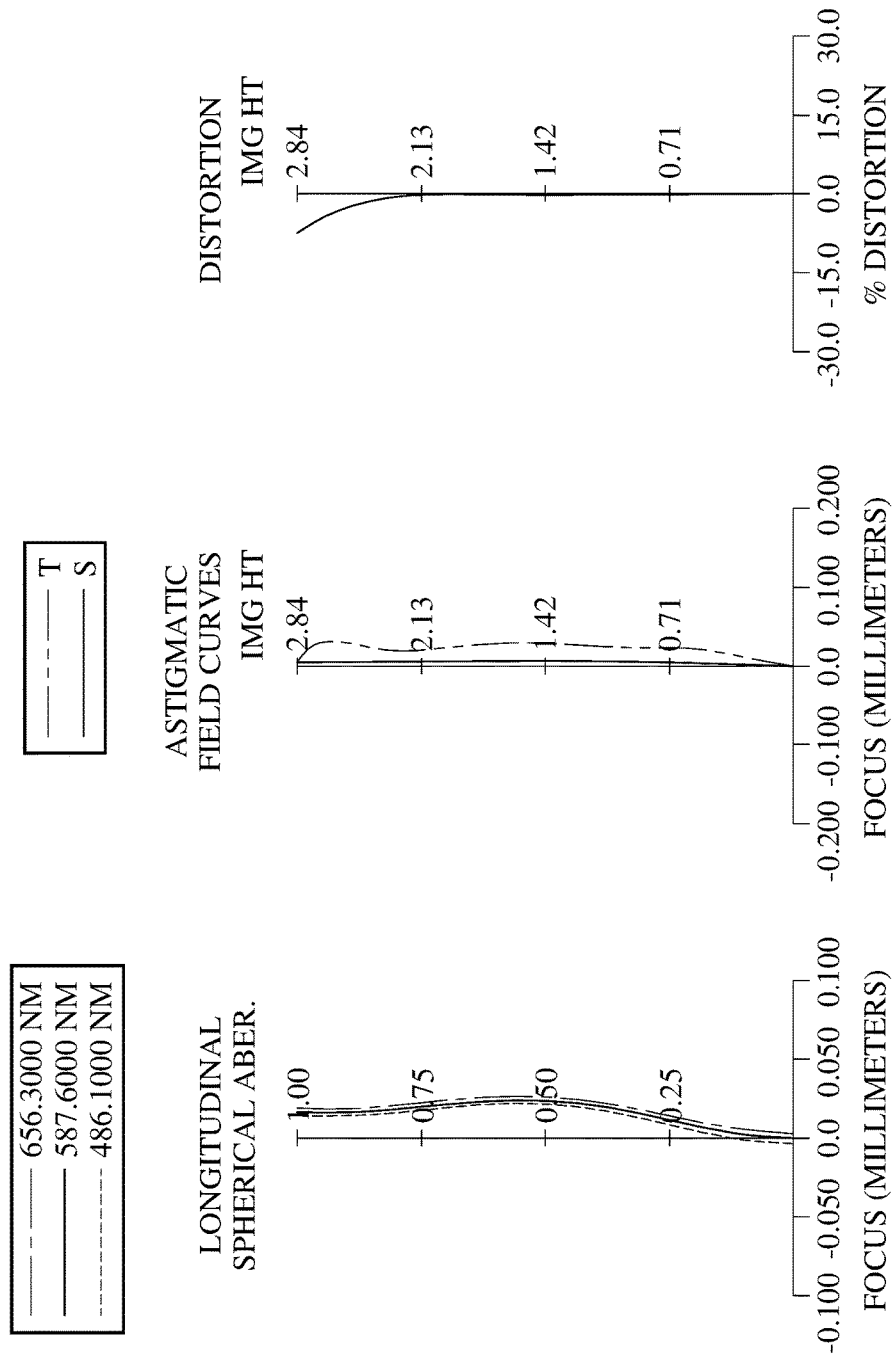
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging lens assembly (its reference numeral is omitted) of the present disclosure and an image sensor 480. The optical imaging lens assembly includes, in order from an object side to an image side, a first lens element 410, an aperture stop 400, a second lens element 420, a third lens element 430, a fourth lens element 440, a fifth lens element 450, an IR-cut filter 460 and an image surface 470. The optical imaging lens assembly includes five lens elements (410, 420, 430, 440 and 450) with no additional lens element disposed between the first lens element 410 and the fifth lens element 450.

The first lens element 410 with negative refractive power has an object-side surface 411 being concave in a paraxial region thereof and an image-side surface 412 being convex in a paraxial region thereof. The first lens element 410 is made of plastic material and has the object-side surface 411 and the image-side surface 412 being both aspheric. The object-side surface 411 of the first lens element 410 has at least one convex critical point in an off-axial region thereof.

The second lens element 420 with positive refractive power has an object-side surface 421 being convex in a paraxial region thereof and an image-side surface 422 being convex in a paraxial region thereof. The second lens element 420 is made of plastic material and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being concave in a paraxial region thereof and an image-side surface 452 being concave in a paraxial region thereof. The fifth lens element 450 is made of plastic material and has the object-side surface 451 and the image-side surface 452 being both aspheric. The image-side surface 452 of the fifth lens element 450 has at least one convex critical point in an off-axial region thereof.

The IR-cut filter 460 is made of glass and located between the fifth lens element 450 and the image surface 470, and will not affect the focal length of the optical imaging lens assembly. The image sensor 480 is disposed on or near the image surface 470 of the optical imaging lens assembly.

The detailed optical data of the 4th embodiment are shown in Table 7 and the aspheric surface data are shown in Table 8 below.

TABLE 7

4th Embodiment
f = 2.30 mm, Fno = 2.25, HFOV = 53.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.445 | (ASP) | 0.250 | Plastic | 1.566 | 37.4 | −18.89 |
| 2 | | −3.287 | (ASP) | 0.833 | | | | |
| 3 | Ape. Stop | Plano | | −0.025 | | | | |
| 4 | Lens 2 | 3.130 | (ASP) | 1.004 | Plastic | 1.544 | 56.0 | 2.00 |
| 5 | | −1.480 | (ASP) | 0.025 | | | | |
| 6 | Lens 3 | 2.122 | (ASP) | 0.201 | Plastic | 1.669 | 19.5 | −6.45 |
| 7 | | 1.369 | (ASP) | 0.467 | | | | |
| 8 | Lens 4 | −2.999 | (ASP) | 0.679 | Plastic | 1.530 | 55.8 | 2.31 |
| 9 | | −0.937 | (ASP) | 0.224 | | | | |
| 10 | Lens 5 | −6.231 | (ASP) | 0.722 | Plastic | 1.614 | 26.0 | −1.63 |
| 11 | | 1.248 | (ASP) | 0.400 | | | | |
| 12 | IR-cut filter | Plano | | 0.110 | Glass | 1.517 | 64.2 | — |
| 13 | | Plano | | 0.052 | | | | |
| 14 | Image | Plano | | — | | | | |

Note:
Reference wavelength is 587.6 nm (d-line).

TABLE 8

Aspheric Coefficients

| Surface # | 1 | 2 | 4 | 5 | 6 |
|---|---|---|---|---|---|
| k = | −9.5554E−01 | 6.8882E+00 | −5.3625E+01 | −1.2151E+00 | 1.2350E+00 |
| A4 = | 3.0258E−01 | 3.8070E−01 | 2.0174E−01 | −2.2234E−03 | −2.9987E−01 |
| A6 = | −2.2681E−01 | −2.3941E−01 | −3.7618E−01 | −5.9492E−02 | 1.9272E−01 |
| A8 = | 1.7892E−01 | 2.3931E−01 | 2.7192E−01 | 2.5809E−01 | −5.7207E−02 |
| A10 = | −9.7051E−02 | −9.5996E−02 | 2.0646E−01 | −5.6239E−01 | −1.6420E−01 |
| A12 = | 3.1961E−02 | 2.9523E−03 | −6.8034E−01 | 2.6075E−01 | 1.5999E−01 |
| A14 = | −4.7140E−03 | 2.0837E−02 | — | — | −8.7259E−02 |

| Surface # | 7 | 8 | 9 | 10 | 11 |
|---|---|---|---|---|---|
| k = | −1.3935E+00 | 1.5714E+00 | −1.3370E+00 | −2.3626E+01 | −5.6140E+00 |
| A4 = | −2.6206E−01 | 7.4136E−02 | 1.5328E−01 | −1.4488E−01 | −1.1556E−01 |
| A6 = | 2.5028E−01 | −1.0237E−01 | −4.5263E−01 | −2.0730E−01 | 6.7829E−02 |
| A8 = | −1.4913E−01 | 2.5364E−01 | 8.0324E−01 | 5.2053E−01 | −2.4727E−02 |
| A10 = | 3.3587E−02 | −2.1783E−01 | −7.7930E−01 | −5.1161E−01 | 5.4868E−03 |
| A12 = | −4.4357E−03 | 5.1664E−02 | 4.5922E−01 | 2.5473E−01 | −7.2955E−04 |
| A14 = | 1.2936E−03 | 3.1432E−02 | −1.4644E−01 | −6.1721E−02 | 5.2483E−05 |
| A16 = | — | −1.6411E−02 | 1.8733E−02 | 5.7679E−03 | −1.5492E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.30 | |R3/R4| | 2.12 |
| Fno | 2.25 | f/f4 | 1.00 |
| HFOV [deg.] | 53.0 | |f1|/R2 | −5.75 |
| V1/(V3 + V5) | 0.82 | f3/f5 | 3.95 |
| CT4/T34 | 1.45 | CRA [deg.] | 41.66 |
| T12/T23 | 32.32 | TL/ImgH | 1.74 |
| (T23 + CT3 + T34)/CT4 | 1.02 | Y11/ImgH | 0.50 |
| (T23 + T34 + T45)/T12 | 0.89 | Y52/f | 1.10 |
| |R2/R1| | 1.34 | Yc11/Yc52 | 0.43 |
| R3/R2 | −0.95 | — | — |

5th Embodiment

Figure 9:
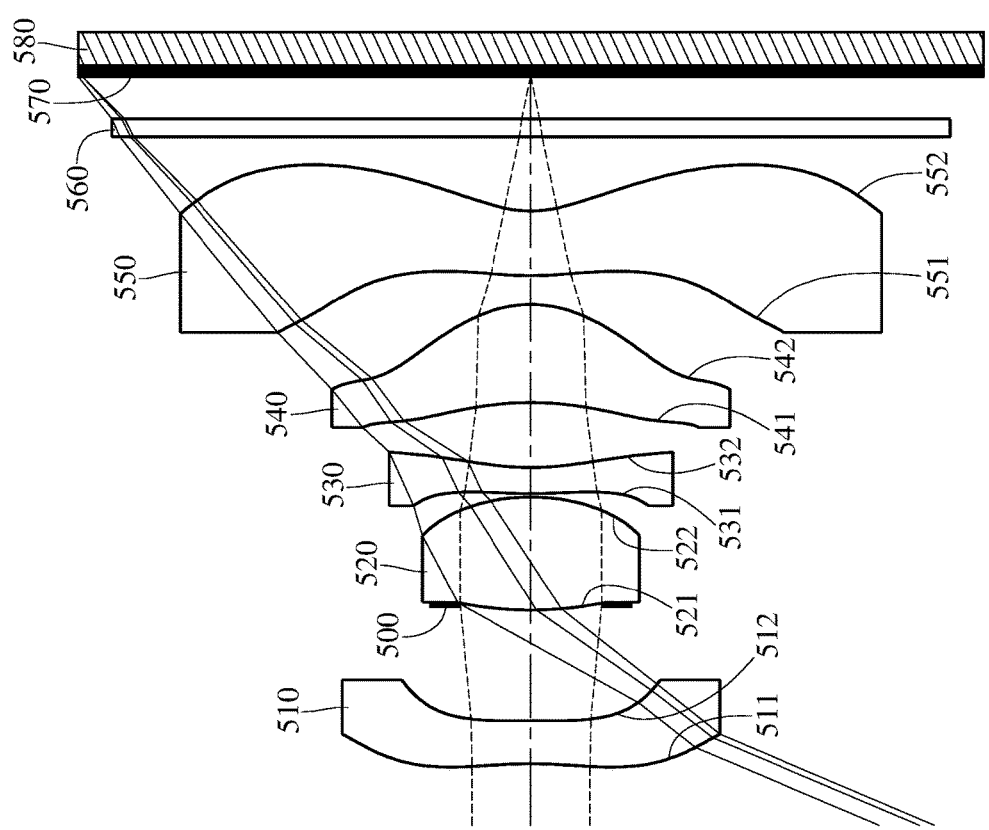
FIG. 9 is a schematic view of an image capturing unit according to the 5th embodiment of the present disclosure.
Figure 10:
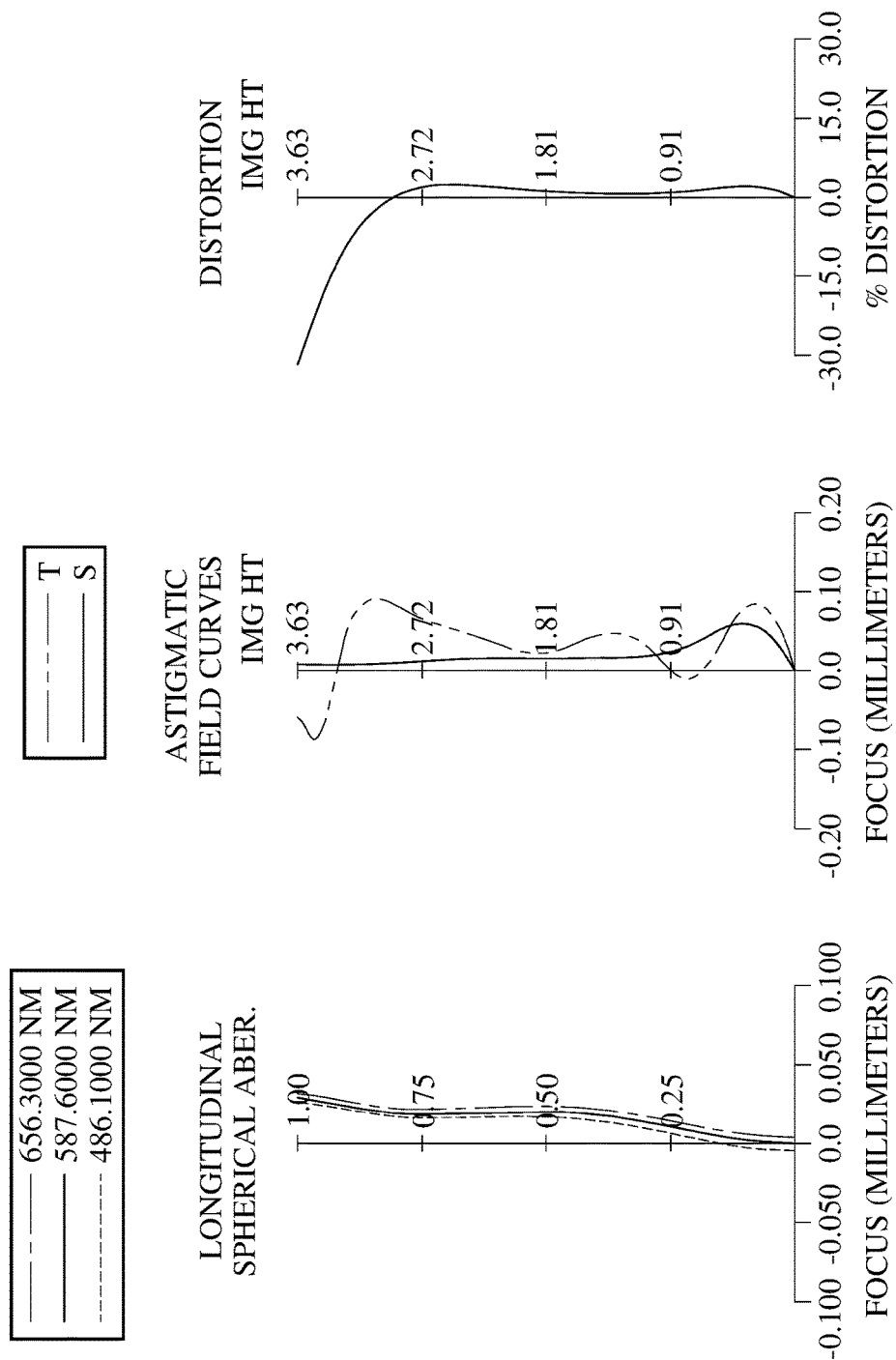
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging lens assembly (its reference numeral is omitted) of the present disclosure and an image sensor 580. The optical imaging lens assembly includes, in order from an object side to an image side, a first lens element 510, an aperture stop 500, a second lens element 520, a third lens element 530, a fourth lens element 540, a fifth lens element 550, an IR-cut filter 560 and an image surface 570. The optical imaging lens assembly includes five lens elements (510, 520, 530, 540 and 550) with no additional lens element disposed between the first lens element 510 and the fifth lens element 550.

The first lens element 510 with negative refractive power has an object-side surface 511 being concave in a paraxial region thereof and an image-side surface 512 being convex in a paraxial region thereof. The first lens element 510 is made of plastic material and has the object-side surface 511 and the image-side surface 512 being both aspheric. The object-side surface 511 of the first lens element 510 has at least one convex critical point in an off-axial region thereof.

The second lens element 520 with positive refractive power has an object-side surface 521 being convex in a paraxial region thereof and an image-side surface 522 being convex in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric. The image-side surface 552 of the fifth lens element 550 has at least one convex critical point in an off-axial region thereof.

The IR-cut filter 560 is made of glass and located between the fifth lens element 550 and the image surface 570, and will not affect the focal length of the optical imaging lens assembly. The image sensor 580 is disposed on or near the image surface 570 of the optical imaging lens assembly.

The detailed optical data of the 5th embodiment are shown in Table 9 and the aspheric surface data are shown in Table 10 below.

TABLE 9

5th Embodiment
f = 2.25 mm, Fno = 2.35, HFOV = 67.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.239 | (ASP) | 0.348 | Plastic | 1.545 | 56.0 | −6.44 |
| 2 | | −43.683 | (ASP) | 0.929 | | | | |
| 3 | Ape. Stop | Plano | | −0.034 | | | | |
| 4 | Lens 2 | 2.895 | (ASP) | 0.919 | Plastic | 1.544 | 56.0 | 2.03 |
| 5 | | −1.590 | (ASP) | 0.029 | | | | |
| 6 | Lens 3 | 5.073 | (ASP) | 0.210 | Plastic | 1.650 | 21.8 | −6.06 |
| 7 | | 2.181 | (ASP) | 0.524 | | | | |
| 8 | Lens 4 | −2.695 | (ASP) | 0.796 | Plastic | 1.544 | 56.0 | 2.31 |
| 9 | | −0.947 | (ASP) | 0.237 | | | | |
| 10 | Lens 5 | 2.263 | (ASP) | 0.522 | Plastic | 1.639 | 23.5 | −2.43 |
| 11 | | 0.839 | (ASP) | 0.600 | | | | |

TABLE 9-continued

5th Embodiment
f = 2.25 mm, Fno = 2.35, HFOV = 67.0 deg.

| Surface # | | Curvature Radius | Thickness | Material | Index | Abbe # | Focal Length |
|---|---|---|---|---|---|---|---|
| 12 | IR-cut filter | Plano | 0.145 | Glass | 1.517 | 64.2 | — |
| 13 | | Plano | 0.342 | | | | |
| 14 | Image | Plano | — | | | | |

Note:
Reference wavelength is 587.6 nm (d-line).
An effective radius of the object-side surface 511 (Surface 1) is 1.528 mm.
An effective radius of the image-side surface 552 (Surface 11) is 2.840 mm.

TABLE 10

Aspheric Coefficients

| Surface # | 1 | 2 | 4 | 5 | 6 |
|---|---|---|---|---|---|
| k = | 1.5125E−01 | 9.0000E+01 | −4.4484E+01 | −5.7801E−01 | 4.3154E+00 |
| A4 = | 2.5335E−01 | 2.4055E−01 | 2.2938E−01 | 5.8551E−02 | −1.4821E−01 |
| A6 = | −1.2600E−01 | 2.7892E−01 | −5.2003E−01 | −6.8621E−01 | −4.4419E−01 |
| A8 = | 4.0147E−02 | −8.3700E−01 | 8.4359E−01 | 1.8592E+00 | 1.1379E+00 |
| A10 = | 2.5732E−03 | 1.0575E+00 | −1.1344E+00 | −2.4590E+00 | −1.2571E+00 |
| A12 = | −5.2481E−03 | −5.4393E−01 | 5.8003E−01 | 1.1016E+00 | 4.7532E−01 |
| A14 = | 8.6318E−04 | 8.5675E−02 | — | — | −7.8179E−03 |

| Surface # | 7 | 8 | 9 | 10 | 11 |
|---|---|---|---|---|---|
| k = | −1.2291E+00 | 8.2788E−01 | −1.2595E+00 | −8.4187E+01 | −6.2788E+00 |
| A4 = | −1.6584E−01 | 6.0835E−02 | 3.2861E−02 | −8.8709E−02 | −5.9586E−02 |
| A6 = | 6.0460E−03 | −2.7916E−01 | 2.8054E−02 | 9.9902E−03 | 2.5669E−02 |
| A8 = | 1.6960E−01 | 7.5913E−01 | −1.5776E−01 | 2.4106E−02 | −8.9247E−03 |
| A10 = | −2.2322E−01 | −8.7030E−01 | 2.4705E−01 | −2.3871E−02 | 2.0157E−03 |
| A12 = | 1.2797E−01 | 5.3777E−01 | −1.4338E−01 | 9.1966E−03 | −2.7395E−04 |
| A14 = | −2.8110E−02 | −1.7674E−01 | 3.6013E−02 | −1.5726E−03 | 1.9993E−05 |
| A16 = | — | 2.3847E−02 | −3.3528E−03 | 9.9440E−05 | −5.9794E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.25 | |R3/R4| | 1.82 |
| Fno | 2.35 | f/f4 | 0.97 |
| HFOV [deg.] | 67.0 | |f1|/R2 | −0.15 |
| V1/(V3 + V5) | 1.24 | f3/f5 | 2.49 |
| CT4/T34 | 1.52 | CRA [deg.] | 42.79 |
| T12/T23 | 30.86 | TL/ImgH | 1.53 |
| (T23 + CT3 + T34)/CT4 | 0.96 | Y11/ImgH | 0.42 |
| (T23 + T34 + T45)/T12 | 0.88 | Y52/f | 1.26 |
| |R2/R1| | 13.49 | Yc11/Yc52 | 0.37 |
| R3/R2 | −0.07 | — | — |

6th Embodiment

Figure 11:
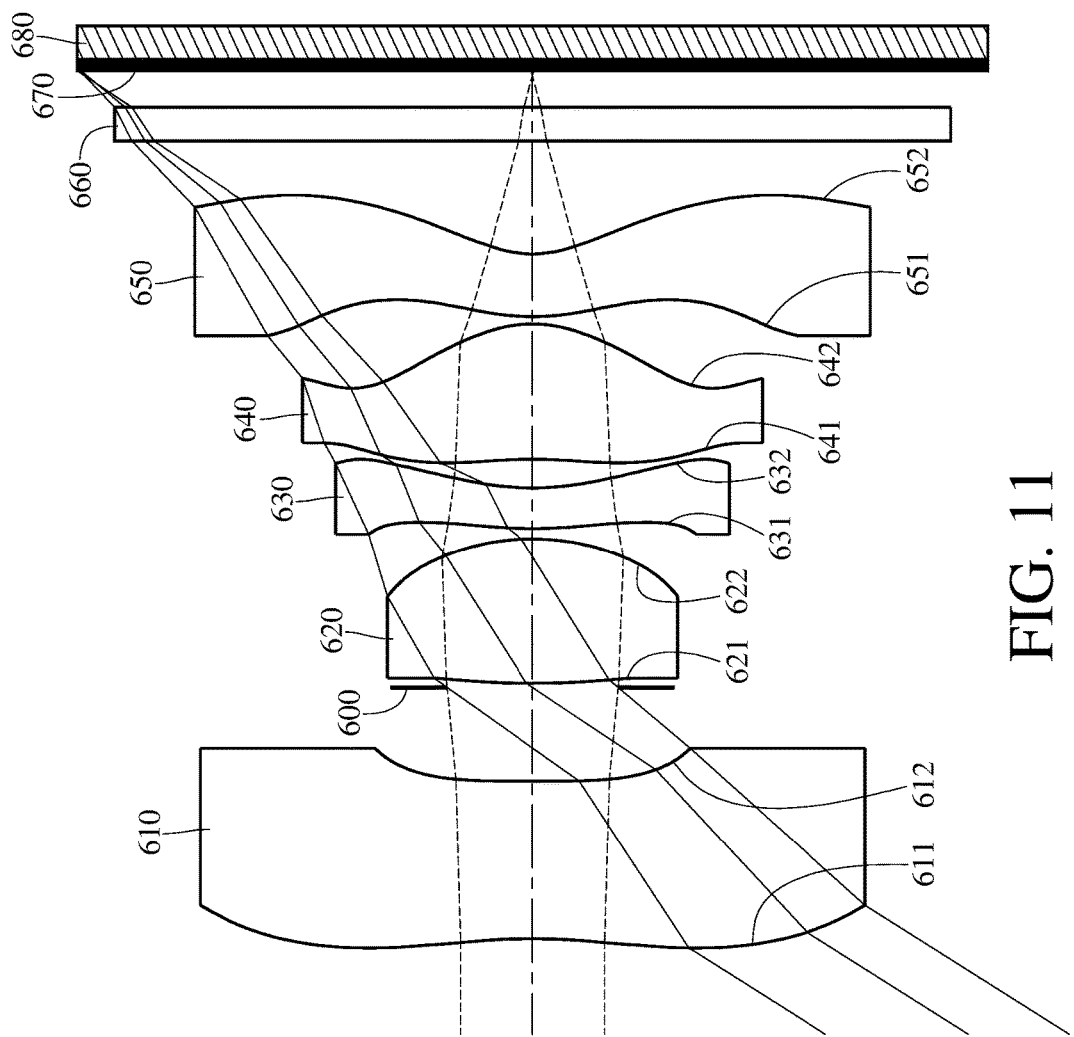
FIG. 11 is a schematic view of an image capturing unit according to the 6th embodiment of the present disclosure.
Figure 12:
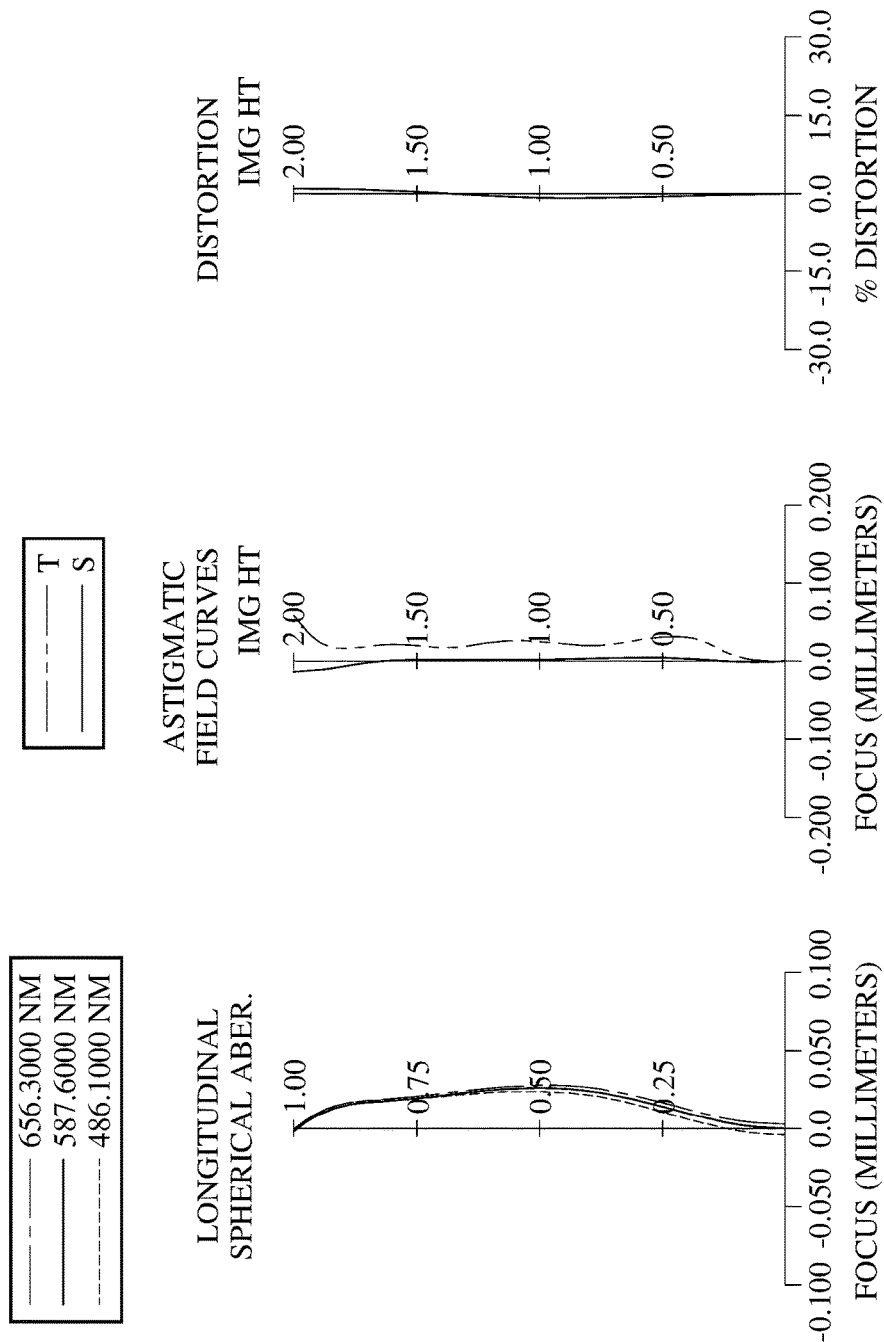
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging lens assembly (its reference numeral is omitted) of the present disclosure and an image sensor 680. The optical imaging lens assembly includes, in order from an object side to an image side, a first lens element 610, an aperture stop 600, a second lens element 620, a third lens element 630, a fourth lens element 640, a fifth lens element 650, an IR-cut filter 660 and an image surface 670. The optical imaging lens assembly includes five lens elements (610, 620, 630, 640 and 650) with no additional lens element disposed between the first lens element 610 and the fifth lens element 650.

The first lens element 610 with negative refractive power has an object-side surface 611 being concave in a paraxial region thereof and an image-side surface 612 being convex in a paraxial region thereof. The first lens element 610 is made of plastic material and has the object-side surface 611 and the image-side surface 612 being both aspheric. The object-side surface 611 of the first lens element 610 has at least one convex critical point in an off-axial region thereof.

The second lens element 620 with positive refractive power has an object-side surface 621 being convex in a paraxial region thereof and an image-side surface 622 being convex in a paraxial region thereof. The second lens element 620 is made of plastic material and has the object-side surface 621 and the image-side surface 622 being both aspheric.

The third lens element 630 with negative refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric. The image-side surface 652 of the fifth lens element 650 has at least one convex critical point in an off-axial region thereof.

The IR-cut filter 660 is made of glass and located between the fifth lens element 650 and the image surface 670, and will not affect the focal length of the optical imaging lens assembly. The image sensor 680 is disposed on or near the image surface 670 of the optical imaging lens assembly.

The detailed optical data of the 6th embodiment are shown in Table 11 and the aspheric surface data are shown in Table 12 below.

TABLE 11

6th Embodiment
f = 1.24 mm, Fno = 1.94, HFOV = 57.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.617 | (ASP) | 0.700 | Plastic | 1.523 | 52.3 | −5.08 |
| 2 | | −188.679 | (ASP) | 0.415 | | | | |
| 3 | Ape. Stop | Plano | | 0.018 | | | | |
| 4 | Lens 2 | 3.455 | (ASP) | 0.641 | Plastic | 1.544 | 56.0 | 1.54 |
| 5 | | −1.030 | (ASP) | 0.046 | | | | |
| 6 | Lens 3 | 1.952 | (ASP) | 0.180 | Plastic | 1.671 | 19.5 | −6.02 |
| 7 | | 1.267 | (ASP) | 0.127 | | | | |
| 8 | Lens 4 | −2.021 | (ASP) | 0.599 | Plastic | 1.544 | 56.0 | 1.22 |
| 9 | | −0.552 | (ASP) | 0.032 | | | | |
| 10 | Lens 5 | 1.004 | (ASP) | 0.280 | Plastic | 1.671 | 19.5 | −1.60 |
| 11 | | 0.460 | (ASP) | 0.500 | | | | |
| 12 | IR-cut filter | Plano | | 0.150 | Glass | 1.517 | 64.2 | — |
| 13 | | Plano | | 0.161 | | | | |
| 14 | Image | Plano | | — | | | | |

Note:
Reference wavelength is 587.6 nm (d-line).

TABLE 12

Aspheric Coefficients

| Surface # | 1 | 2 | 4 | 5 | 6 |
|---|---|---|---|---|---|
| k = | −2.6875E+01 | 9.0000E+01 | −6.0801E+01 | 5.2370E−01 | −7.0829E+01 |
| A4 = | 1.6790E−01 | 8.1404E−01 | 7.5858E−02 | 1.6186E−01 | 4.4655E−01 |
| A6 = | −1.2648E−01 | −1.8227E+00 | 5.0361E−01 | −1.6381E+00 | −6.8751E+00 |
| A8 = | 8.7073E−02 | 5.9310E+00 | −7.0550E+00 | 1.4811E+01 | 3.0289E+01 |
| A10 = | −3.9032E−02 | −1.2532E+01 | −6.7242E+00 | −5.0887E+01 | −6.4412E+01 |
| A12 = | 1.0451E−02 | 1.8492E+01 | 8.7018E+01 | 5.1693E+01 | 6.1708E+01 |
| A14 = | −1.2674E−03 | −1.1193E+01 | — | — | −2.1890E+01 |

| Surface # | 7 | 8 | 9 | 10 | 11 |
|---|---|---|---|---|---|
| k = | −1.4131E+00 | −5.3074E+01 | −2.6505E+00 | −2.1384E+00 | −3.8944E+00 |
| A4 = | −8.2325E−03 | 5.9203E−01 | 3.3779E−01 | −8.6282E−01 | −5.0700E−01 |
| A6 = | −2.8394E+00 | −1.4661E−01 | −2.7496E+00 | 1.3854E−01 | 6.7721E−01 |
| A8 = | 1.0575E+01 | −2.3299E+00 | 9.1055E+00 | 2.0877E+00 | −5.9706E−01 |
| A10 = | −1.7446E+01 | 7.3833E+00 | −1.1948E+01 | −4.2353E+00 | 3.2284E−01 |
| A12 = | 1.2670E+01 | −1.0881E+01 | 7.5466E+00 | 3.7713E+00 | −1.0382E−01 |
| A14 = | −3.2334E+00 | 7.4923E+00 | −2.2820E+00 | −1.5815E+00 | 1.8700E−02 |
| A16 = | — | −1.9396E+00 | 2.5757E−01 | 2.5215E−01 | −1.4929E−03 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.24 | \|R3/R4\| | 3.35 |
| Fno | 1.94 | f/f4 | 1.02 |
| HFOV [deg.] | 57.6 | \|f1\|/R2 | −0.03 |
| V1/(V3 + V5) | 1.34 | f3/f5 | 3.77 |
| CT4/T34 | 4.72 | CRA [deg.] | 50.50 |
| T12/T23 | 9.41 | TL/ImgH | 1.92 |
| (T23 + CT3 + T34)/CT4 | 0.59 | Y11/ImgH | 0.74 |
| (T23 + T34 + T45)/T12 | 0.47 | Y52/f | 1.21 |
| \|R2/R1\| | 72.08 | Yc11/Yc52 | 0.69 |
| R3/R2 | −0.02 | — | — |

7th Embodiment

Figure 13:
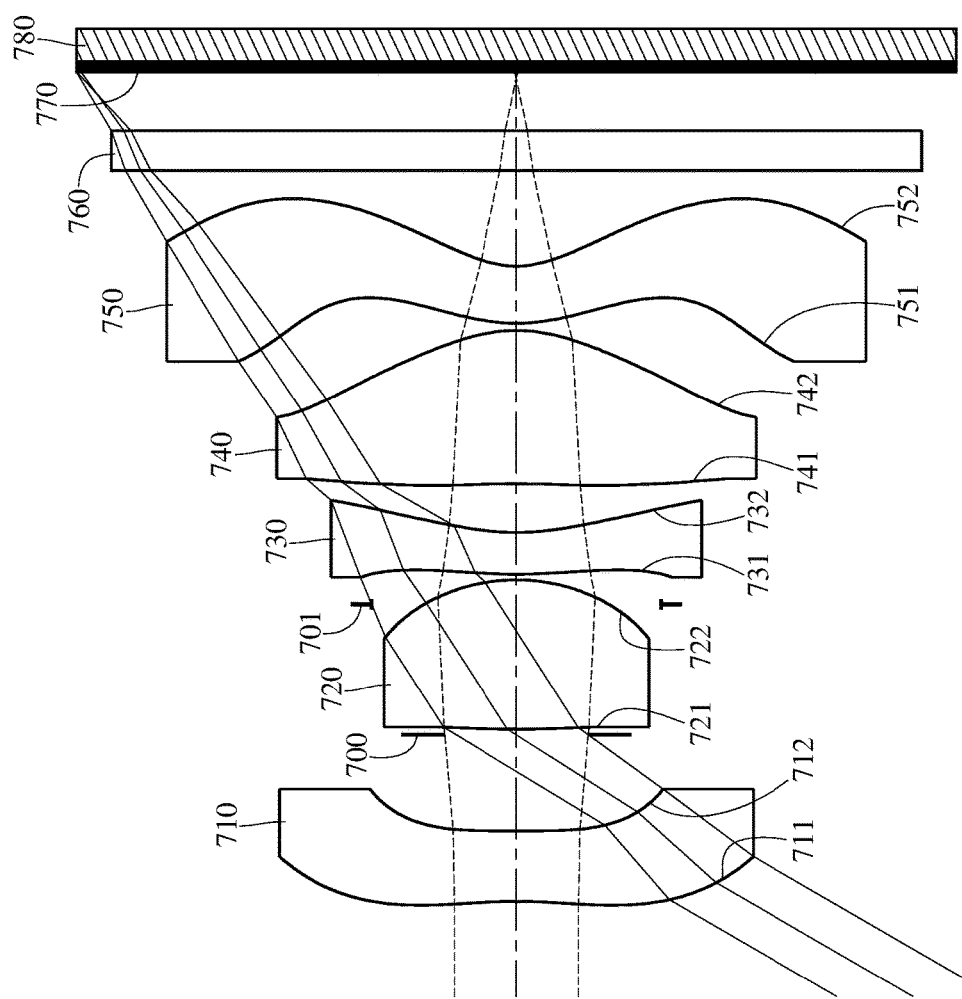
FIG. 13 is a schematic view of an image capturing unit according to the 7th embodiment of the present disclosure.
Figure 14:
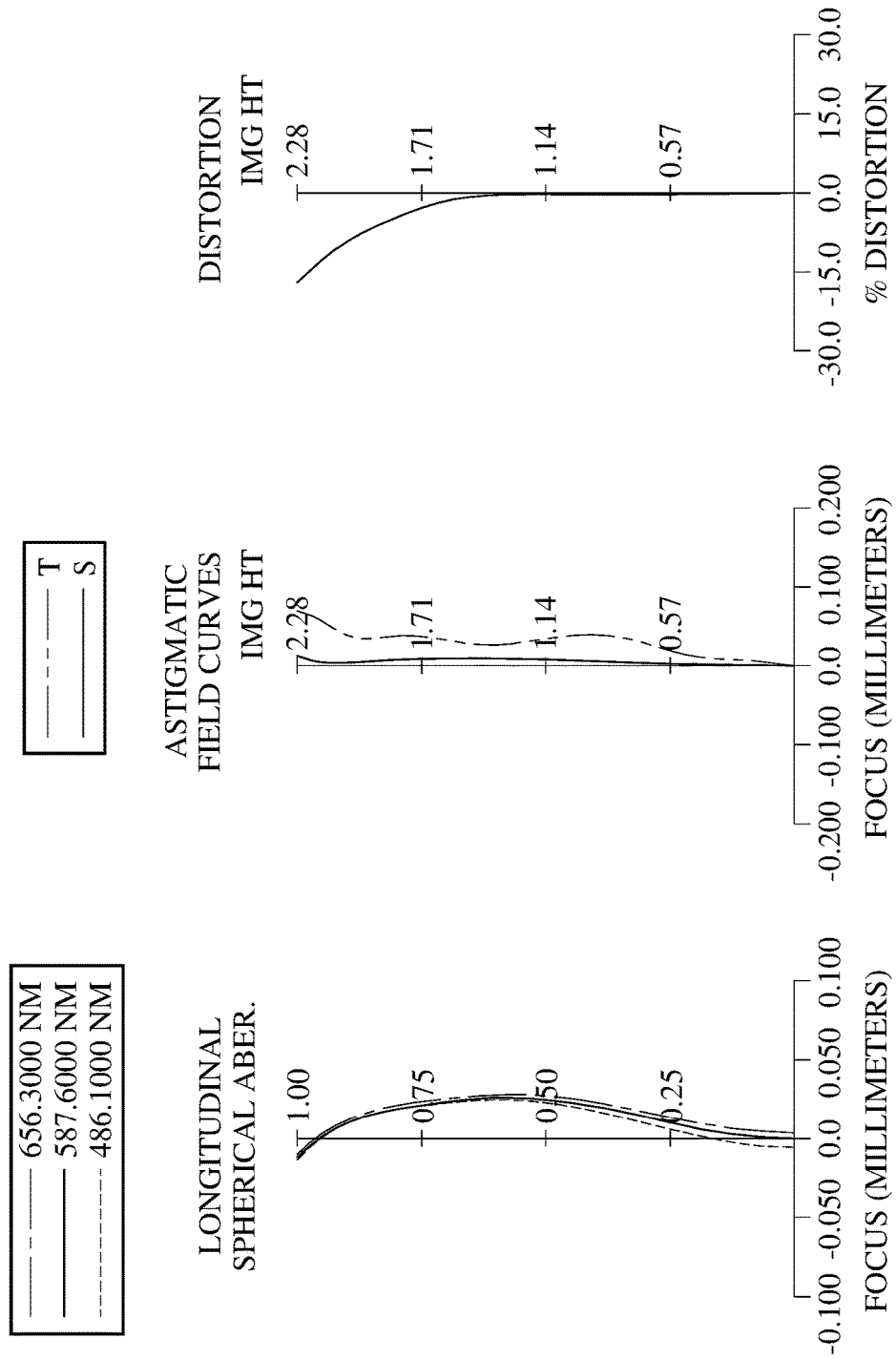
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging lens assembly (its reference numeral is omitted) of the present disclosure and an image sensor 780. The optical imaging lens assembly includes, in order from an object side to an image side, a first lens element 710, an aperture stop 700, a second lens element 720, a stop 701, a third lens element 730, a fourth lens element 740, a fifth lens element 750, an IR-cut filter 760 and an image surface 770. The optical imaging lens assembly includes five lens elements (710, 720, 730, 740 and 750) with no additional lens element disposed between the first lens element 710 and the fifth lens element 750.

The first lens element 710 with negative refractive power has an object-side surface 711 being concave in a paraxial region thereof and an image-side surface 712 being convex in a paraxial region thereof. The first lens element 710 is made of plastic material and has the object-side surface 711 and the image-side surface 712 being both aspheric. The object-side surface 711 of the first lens element 710 has at least one convex critical point in an off-axial region thereof.

The second lens element 720 with positive refractive power has an object-side surface 721 being convex in a paraxial region thereof and an image-side surface 722 being convex in a paraxial region thereof. The second lens element 720 is made of plastic material and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric.

The fourth lens element 740 with positive refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric. The image-side surface 752 of the fifth lens element 750 has at least one convex critical point in an off-axial region thereof.

The IR-cut filter 760 is made of glass and located between the fifth lens element 750 and the image surface 770, and will not affect the focal length of the optical imaging lens assembly. The image sensor 780 is disposed on or near the image surface 770 of the optical imaging lens assembly.

The detailed optical data of the 7th embodiment are shown in Table 13 and the aspheric surface data are shown in Table 14 below.

TABLE 13

7th Embodiment
f = 1.59 mm, Fno = 2.43, HFOV = 59.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.642 | (ASP) | 0.370 | Plastic | 1.545 | 56.1 | −4.90 |
| 2 | | −281.253 | (ASP) | 0.505 | | | | |
| 3 | Ape. Stop | Plano | | 0.030 | | | | |
| 4 | Lens 2 | 5.775 | (ASP) | 0.785 | Plastic | 1.545 | 56.1 | 1.71 |
| 5 | | −1.058 | (ASP) | −0.127 | | | | |
| 6 | Stop | Plano | | 0.157 | | | | |
| 7 | Lens 3 | 2.330 | (ASP) | 0.220 | Plastic | 1.660 | 20.4 | −5.49 |
| 8 | | 1.365 | (ASP) | 0.255 | | | | |
| 9 | Lens 4 | −4.550 | (ASP) | 0.808 | Plastic | 1.545 | 56.1 | 1.62 |
| 10 | | −0.785 | (ASP) | 0.038 | | | | |
| 11 | Lens 5 | 0.962 | (ASP) | 0.300 | Plastic | 1.660 | 20.4 | −2.11 |
| 12 | | 0.498 | (ASP) | 0.500 | | | | |

TABLE 13-continued

7th Embodiment
f = 1.59 mm, Fno = 2.43, HFOV = 59.9 deg.

| Surface # | | Curvature Radius | Thickness | Material | Index | Abbe # | Focal Length |
|---|---|---|---|---|---|---|---|
| 13 | IR-cut filter | Plano | 0.210 | Glass | 1.517 | 64.2 | — |
| 14 | | Plano | 0.311 | | | | |
| 15 | Image | Plano | — | | | | |

Note:
Reference wavelength is 587.6 nm (d-line).
An effective radius of the stop 701 (Surface 6) is 0.760 mm.

TABLE 14

Aspheric Coefficients

| Surface # | 1 | 2 | 4 | 5 | 7 |
|---|---|---|---|---|---|
| k = | −5.1651E+01 | −9.0000E+01 | −1.2861E+01 | −6.3510E−02 | −4.6374E+01 |
| A4 = | 2.8843E−01 | 8.3652E−01 | −9.6076E−02 | −4.3514E−01 | −4.2809E−01 |
| A6 = | −2.0867E−01 | −1.1983E+00 | −7.0407E−01 | 1.8720E+00 | 6.6269E−01 |
| A8 = | 1.1314E−01 | 2.3176E+00 | 6.8855E+00 | −3.8318E+00 | 3.5256E−01 |
| A10 = | −1.0828E−02 | −2.9081E+00 | −5.7383E+01 | 8.8638E+00 | −2.8454E+00 |
| A12 = | −1.3513E−02 | 3.5880E+00 | 1.5954E+02 | 1.9816E+00 | 2.6384E+00 |
| A14 = | 3.8124E−03 | −1.9987E+00 | — | — | −4.7533E−01 |

| Surface # | 8 | 9 | 10 | 11 | 12 |
|---|---|---|---|---|---|
| k = | −1.9020E+00 | 9.9168E−01 | −4.7713E+00 | −4.8346E+00 | −3.2683E+00 |
| A4 = | −3.6688E−01 | 4.3948E−01 | −1.4812E−01 | −2.0975E−01 | −2.2278E−01 |
| A6 = | 2.4695E−02 | −4.8700E−01 | 4.6497E−01 | −1.0201E−01 | 1.2159E−01 |
| A8 = | 1.3952E+00 | −4.3163E−01 | −7.6835E−01 | 2.2687E−01 | −5.3872E−02 |
| A10 = | −2.6981E+00 | 1.8722E+00 | 6.7954E−01 | −3.0376E−01 | 1.6660E−02 |
| A12 = | 2.0608E+00 | −2.1664E+00 | −3.1902E−01 | 2.2089E−01 | −3.7742E−03 |
| A14 = | −5.7203E−01 | 1.1322E+00 | 8.0370E−02 | −7.3003E−02 | 6.2618E−04 |
| A16 = | — | −2.2794E−01 | −9.4343E−03 | 8.8321E−03 | −5.2292E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.59 | |R3/R4| | 5.46 |
| Fno | 2.43 | f/f4 | 0.98 |
| HFOV [deg.] | 59.9 | |f1|/R2 | −0.02 |
| V1/(V3 + V5) | 1.37 | f3/f5 | 2.60 |
| CT4/T34 | 3.17 | CRA [deg.] | 35.65 |
| T12/T23 | 17.83 | TL/ImgH | 1.91 |
| (T23 + CT3 + T34)/CT4 | 0.63 | Y11/ImgH | 0.54 |
| (T23 + T34 + T45)/T12 | 0.60 | Y52/f | 1.16 |
| |R2/R1| | 106.46 | Yc11/Yc52 | 0.43 |
| R3/R2 | −0.02 | — | — |

8th Embodiment

Figure 15:
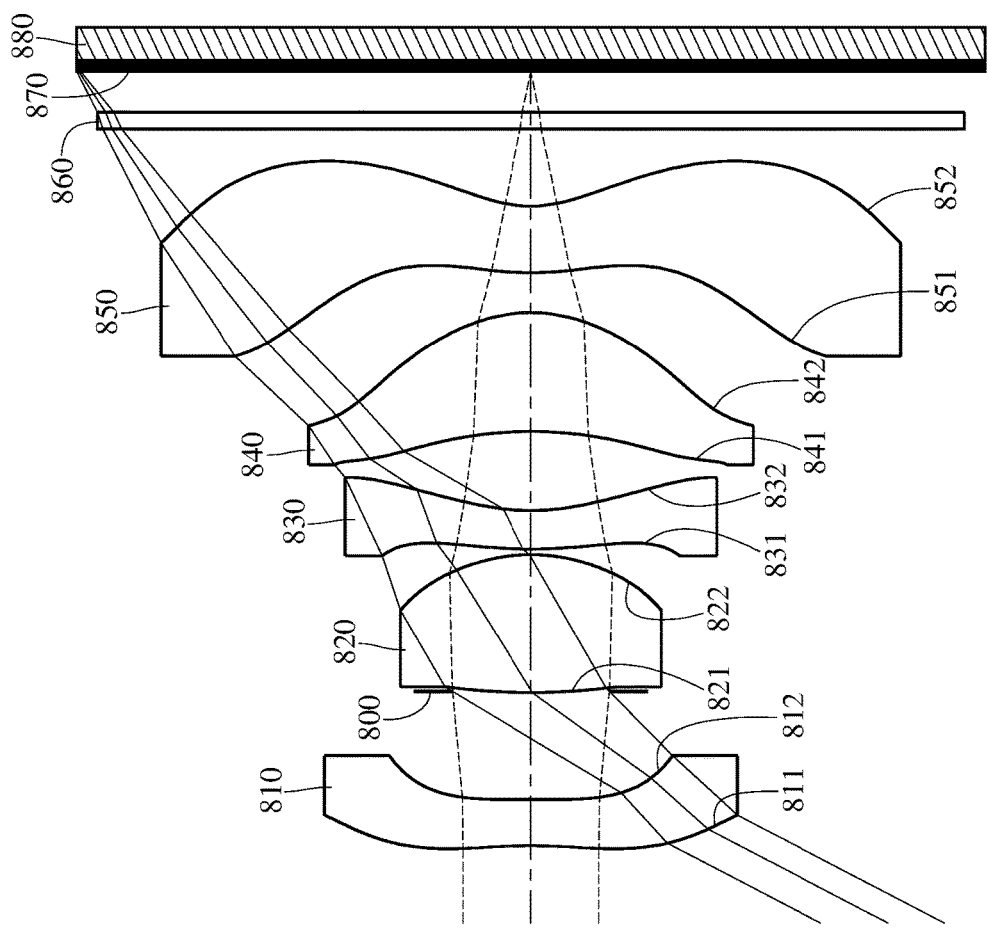
FIG. 15 is a schematic view of an image capturing unit according to the 8th embodiment of the present disclosure.
Figure 16:
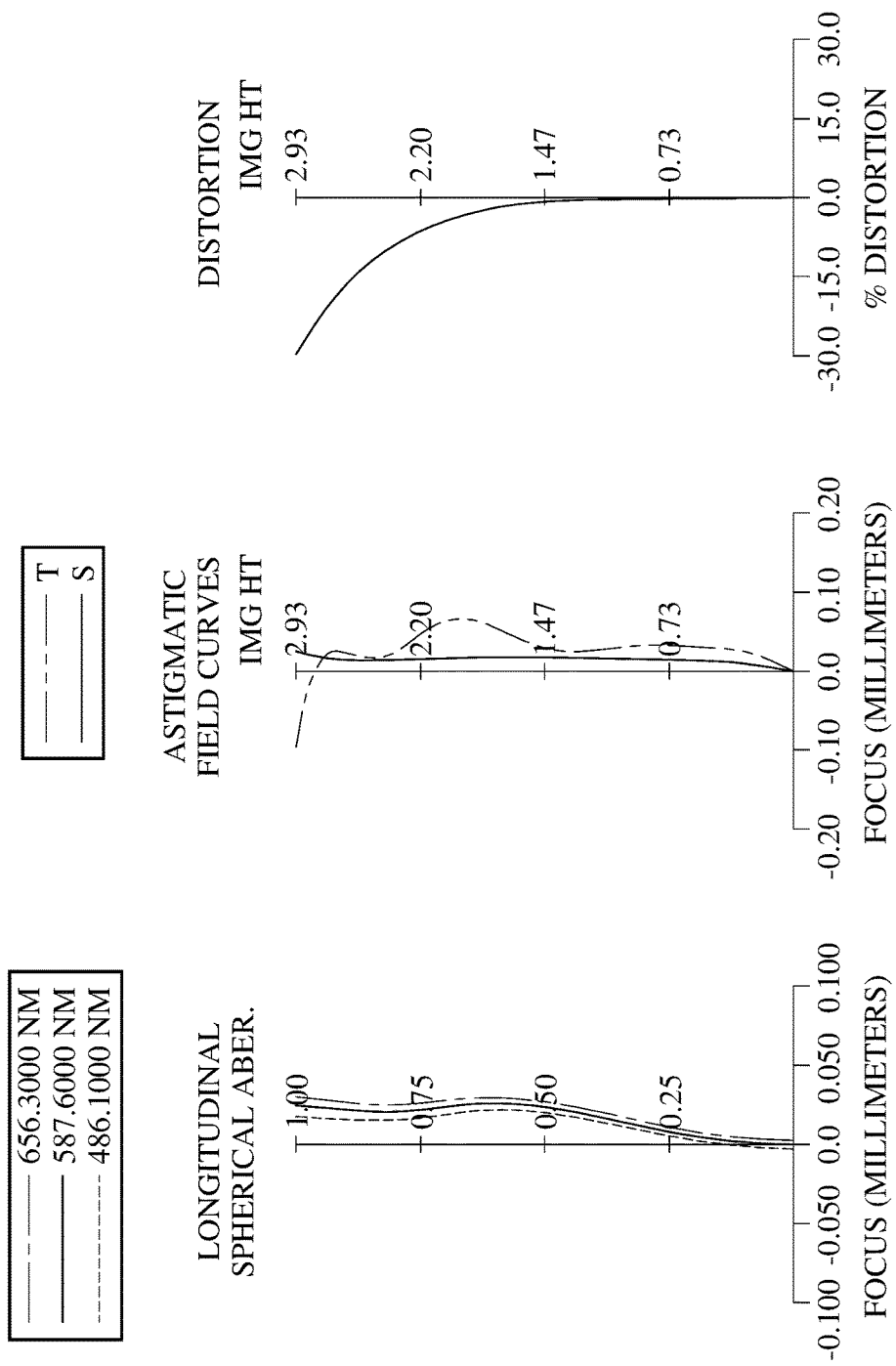
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging lens assembly (its reference numeral is omitted) of the present disclosure and an image sensor 880. The optical imaging lens assembly includes, in order from an object side to an image side, a first lens element 810, an aperture stop 800, a second lens element 820, a third lens element 830, a fourth lens element 840, a fifth lens element 850, an IR-cut filter 860 and an image surface 870. The optical imaging lens assembly includes five lens elements (810, 820, 830, 840 and 850) with no additional lens element disposed between the first lens element 810 and the fifth lens element 850.

The first lens element 810 with negative refractive power has an object-side surface 811 being concave in a paraxial region thereof and an image-side surface 812 being convex in a paraxial region thereof. The first lens element 810 is made of plastic material and has the object-side surface 811 and the image-side surface 812 being both aspheric. The object-side surface 811 of the first lens element 810 has at least one convex critical point in an off-axial region thereof.

The second lens element 820 with positive refractive power has an object-side surface 821 being convex in a paraxial region thereof and an image-side surface 822 being convex in a paraxial region thereof. The second lens element 820 is made of plastic material and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric.

The fourth lens element 840 with positive refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with negative refractive power has an object-side surface 851 being convex in a paraxial region thereof and an image-side surface 852 being concave in a paraxial region thereof. The fifth lens element 850 is made of plastic material and has the object-side surface 851 and the image-side surface 852 being both aspheric. The image-side surface 852 of the fifth lens element 850 has at least one convex critical point in an off-axial region thereof.

The IR-cut filter 860 is made of glass and located between the fifth lens element 850 and the image surface 870, and will not affect the focal length of the optical imaging lens assembly. The image sensor 880 is disposed on or near the image surface 870 of the optical imaging lens assembly.

The detailed optical data of the 8th embodiment are shown in Table 15 and the aspheric surface data are shown in Table 16 below.

TABLE 15

8th Embodiment
f = 2.17 mm, Fno = 2.45, HFOV = 62.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.331 | (ASP) | 0.300 | Plastic | 1.545 | 56.1 | −6.74 |
| 2 | | −37.021 | (ASP) | 0.700 | | | | |
| 3 | Ape. Stop | Plano | | −0.008 | | | | |
| 4 | Lens 2 | 3.798 | (ASP) | 0.898 | Plastic | 1.545 | 56.1 | 1.73 |
| 5 | | −1.146 | (ASP) | 0.036 | | | | |
| 6 | Lens 3 | 2.973 | (ASP) | 0.250 | Plastic | 1.660 | 20.4 | −4.63 |
| 7 | | 1.457 | (ASP) | 0.513 | | | | |
| 8 | Lens 4 | −2.382 | (ASP) | 0.773 | Plastic | 1.545 | 56.1 | 2.59 |
| 9 | | −0.988 | (ASP) | 0.258 | | | | |
| 10 | Lens 5 | 1.748 | (ASP) | 0.432 | Plastic | 1.639 | 23.3 | −2.56 |
| 11 | | 0.764 | (ASP) | 0.500 | | | | |
| 12 | IR-cut filter | Plano | | 0.110 | Glass | 1.517 | 64.2 | — |
| 13 | | Plano | | 0.263 | | | | |
| 14 | Image | Plano | | — | | | | |

Note:
Reference wavelength is 587.6 nm (d-line).

TABLE 16

Aspheric Coefficients

| Surface # | 1 | 2 | 4 | 5 | 6 |
|---|---|---|---|---|---|
| k = | 6.6530E−01 | 9.0000E+01 | −7.5190E+01 | −9.4879E−01 | 3.0239E+00 |
| A4 = | 3.6243E−01 | 4.6556E−01 | 1.7990E−01 | 1.7280E−01 | −1.4209E−01 |
| A6 = | −2.8420E−01 | −2.2144E−01 | −7.3281E−01 | −1.0341E+00 | −4.1427E−01 |
| A8 = | 1.8677E−01 | 1.9512E−01 | 2.7465E+00 | 2.7356E+00 | 1.1896E+00 |
| A10 = | −7.0018E−02 | −2.9218E−01 | −8.4167E+00 | −3.9844E+00 | −1.6041E+00 |
| A12 = | 1.0495E−02 | 7.4730E−01 | 9.8899E+00 | 2.0459E+00 | 7.9936E−01 |
| A14 = | −3.3501E−04 | −4.8545E−01 | — | — | −9.1431E−02 |

| Surface # | 7 | 8 | 9 | 10 | 11 |
|---|---|---|---|---|---|
| k = | −1.4405E+00 | 1.5227E+00 | −1.0947E+00 | −1.8415E+01 | −4.5394E+00 |
| A4 = | −2.4127E−01 | 1.0788E−01 | 5.8613E−02 | −2.2484E−01 | −1.5320E−01 |
| A6 = | 1.8456E−01 | −1.7473E−01 | −1.0600E−01 | 4.3110E−02 | 8.0592E−02 |
| A8 = | −2.2518E−02 | 7.9038E−02 | 1.4279E−01 | 1.7743E−02 | −2.9375E−02 |
| A10 = | −1.4606E−01 | 2.8166E−02 | −2.2870E−02 | −1.3734E−02 | 6.5168E−03 |
| A12 = | 1.2879E−01 | −3.6692E−01 | 2.3650E−01 | 4.4474E−03 | −8.2558E−04 |
| A14 = | −3.4776E−02 | 1.7613E−01 | −1.0506E−01 | −7.2256E−04 | 4.9261E−05 |
| A16 = | — | −3.2113E−02 | 1.6393E−02 | 4.6312E−05 | −6.8728E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.17 | \|R3/R4\| | 3.31 |
| Fno | 2.45 | f/f4 | 0.84 |
| HFOV [deg.] | 62.5 | \|f1\|/R2 | −0.18 |
| V1/(V3 + V5) | 1.28 | f3/f5 | 1.81 |
| CT4/T34 | 1.51 | CRA [deg.] | 33.45 |
| T12/T23 | 19.22 | TL/ImgH | 1.71 |
| (T23 + CT3 + T34)/CT4 | 1.03 | Y11/ImgH | 0.46 |
| (T23 + T34 + T45)/T12 | 1.17 | Y52/f | 1.11 |
| \|R2/R1\| | 11.11 | Yc11/Yc52 | 0.40 |
| R3/R2 | −0.10 | — | — |

9th Embodiment

Figure 17:
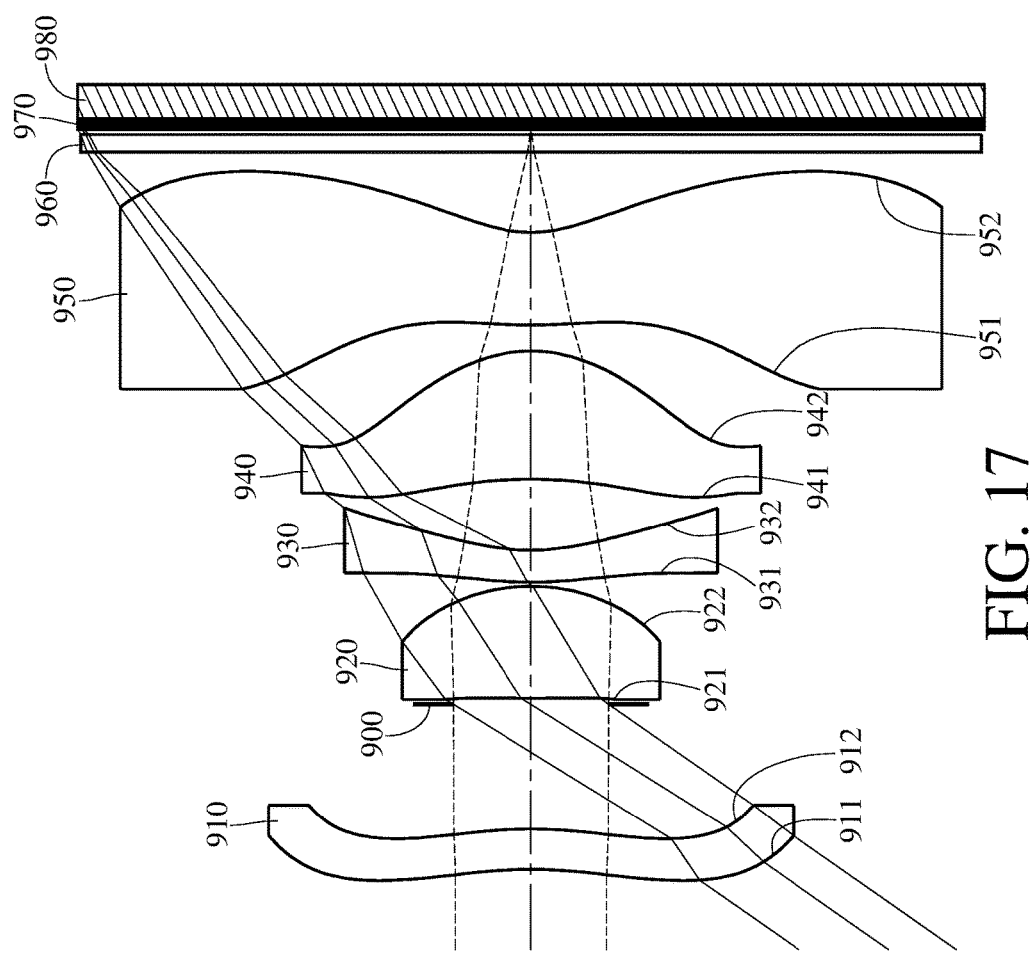
FIG. 17 is a schematic view of an image capturing unit according to the 9th embodiment of the present disclosure.
Figure 18:
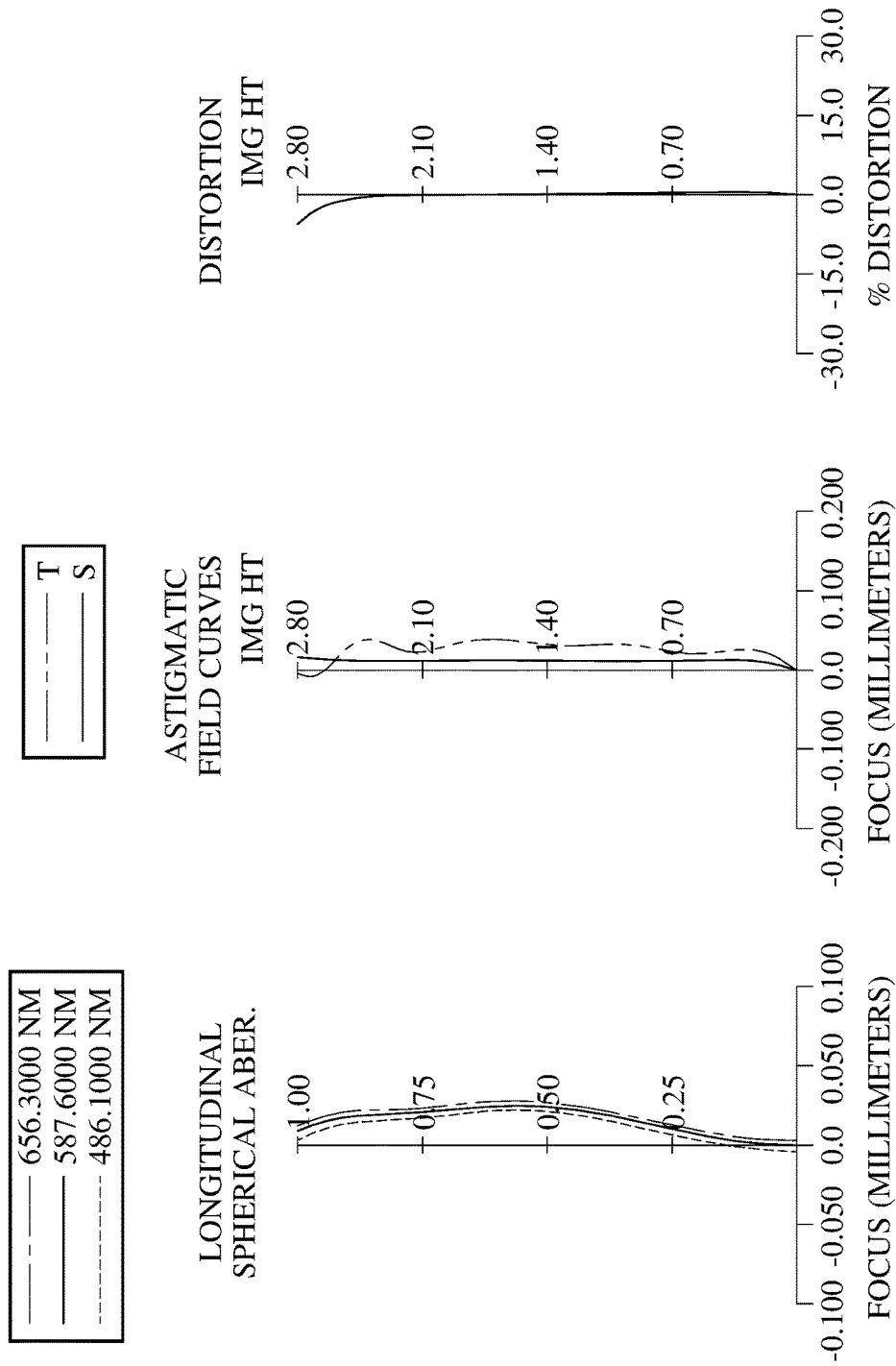
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical imaging lens assembly (its reference numeral is omitted) of the present disclosure and an image sensor 980. The optical imaging lens assembly includes, in order from an object side to an image side, a first lens element 910, an aperture stop 900, a second lens element 920, a third lens element 930, a fourth lens element 940, a fifth lens element 950, an IR-cut filter 960 and an image surface 970. The optical imaging lens assembly includes five lens elements (910, 920, 930, 940 and 950) with no additional lens element disposed between the first lens element 910 and the fifth lens element 950.

The first lens element 910 with positive refractive power has an object-side surface 911 being concave in a paraxial region thereof and an image-side surface 912 being convex in a paraxial region thereof. The first lens element 910 is made of plastic material and has the object-side surface 911 and the image-side surface 912 being both aspheric. The object-side surface 911 of the first lens element 910 has at least one convex critical point in an off-axial region thereof.

The second lens element 920 with positive refractive power has an object-side surface 921 being convex in a paraxial region thereof and an image-side surface 922 being convex in a paraxial region thereof. The second lens element 920 is made of plastic material and has the object-side surface 921 and the image-side surface 922 being both aspheric.

The third lens element 930 with negative refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric.

The fourth lens element 940 with positive refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric.

The fifth lens element 950 with negative refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric. The image-side surface 952 of the fifth lens element 950 has at least one convex critical point in an off-axial region thereof.

The IR-cut filter 960 is made of glass and located between the fifth lens element 950 and the image surface 970, and will not affect the focal length of the optical imaging lens assembly. The image sensor 980 is disposed on or near the image surface 970 of the optical imaging lens assembly.

The detailed optical data of the 9th embodiment are shown in Table 17 and the aspheric surface data are shown in Table 18 below.

TABLE 17

9th Embodiment
f = 2.07 mm, Fno = 2.19, HFOV = 55.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.635 | (ASP) | 0.252 | Plastic | 1.545 | 56.0 | 69.10 |
| 2 | | −2.546 | (ASP) | 0.778 | | | | |
| 3 | Ape. Stop | Plano | | 0.038 | | | | |
| 4 | Lens 2 | 18.489 | (ASP) | 0.698 | Plastic | 1.544 | 56.0 | 2.03 |
| 5 | | −1.156 | (ASP) | 0.025 | | | | |
| 6 | Lens 3 | 2.392 | (ASP) | 0.200 | Plastic | 1.660 | 20.4 | −5.04 |
| 7 | | 1.345 | (ASP) | 0.445 | | | | |
| 8 | Lens 4 | −2.640 | (ASP) | 0.798 | Plastic | 1.544 | 56.0 | 2.09 |
| 9 | | −0.880 | (ASP) | 0.161 | | | | |
| 10 | Lens 5 | 2.660 | (ASP) | 0.580 | Plastic | 1.614 | 26.0 | −1.92 |
| 11 | | 0.750 | (ASP) | 0.500 | | | | |
| 12 | IR-cut filter | Plano | | 0.110 | Glass | 1.517 | 64.2 | — |
| 13 | | Plano | | 0.032 | | | | |
| 14 | Image | Plano | | — | | | | |

Note:
Reference wavelength is 587.6 nm (d-line).

TABLE 18

Aspheric Coefficients

| Surface # | 1 | 2 | 4 | 5 | 6 |
|---|---|---|---|---|---|
| k = | 1.9903E−01 | 1.8187E+00 | −3.6893E+01 | −6.7884E−01 | 2.0211E+00 |
| A4 = | 2.0082E−01 | 2.5887E−01 | −1.1692E−01 | −1.5269E−02 | −3.9999E−01 |
| A6 = | −1.4005E−01 | −2.1250E−01 | −2.6908E−01 | −3.5555E−01 | 4.1917E−01 |
| A8 = | 1.0764E−01 | 2.2930E−01 | 1.2476E+00 | 1.6149E+00 | −2.0204E−03 |
| A10 = | −5.2248E−02 | −1.5118E−01 | −7.4049E+00 | −3.6707E+00 | −8.1785E−01 |
| A12 = | 1.4402E−02 | 5.7291E−02 | 1.2327E+01 | 2.4510E+00 | 9.1476E−01 |
| A14 = | −1.6227E−03 | −8.3767E−03 | — | — | −3.0511E−01 |

| Surface # | 7 | 8 | 9 | 10 | 11 |
|---|---|---|---|---|---|
| k = | −1.3735E+00 | −2.5535E+00 | −1.2908E+00 | −9.0000E+01 | −5.1562E+00 |
| A4 = | −3.7966E−01 | 1.0684E−01 | 1.6487E−03 | −2.1323E−01 | −1.1033E−01 |
| A6 = | 5.1898E−01 | −3.3633E−01 | 1.3871E−01 | 4.7964E−02 | 6.2955E−02 |
| A8 = | −4.3704E−01 | 7.5102E−01 | −4.3119E−01 | 6.4762E−02 | −2.3226E−02 |
| A10 = | 1.5925E−01 | −7.7659E−01 | 5.9103E−01 | −6.5007E−02 | 5.3690E−03 |
| A12 = | 1.2679E−02 | 4.3851E−01 | −3.4624E−01 | 2.6614E−02 | −7.6353E−04 |
| A14 = | −1.5977E−02 | −1.3296E−01 | 9.1920E−02 | −5.1711E−03 | 6.1000E−05 |
| A16 = | — | 1.6935E−02 | −9.1819E−03 | 3.8800E−04 | −2.1025E−06 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 2.07 | |R3/R4| | 15.99 |
| Fno | 2.19 | f/f4 | 0.99 |
| HFOV [deg.] | 55.0 | |f1|/R2 | −27.14 |
| V1/(V3 + V5) | 1.21 | f3/f5 | 2.62 |
| CT4/T34 | 1.79 | CRA [deg.] | 39.01 |
| T12/T23 | 32.64 | TL/ImgH | 1.65 |
| (T23 + CT3 + T34)/CT4 | 0.84 | Y11/ImgH | 0.58 |
| (T23 + T34 + T45)/T12 | 0.77 | Y52/f | 1.24 |
| |R2/R1| | 0.97 | Yc11/Yc52 | 0.53 |
| R3/R2 | −7.26 | — | — |

10th Embodiment

Figure 19:
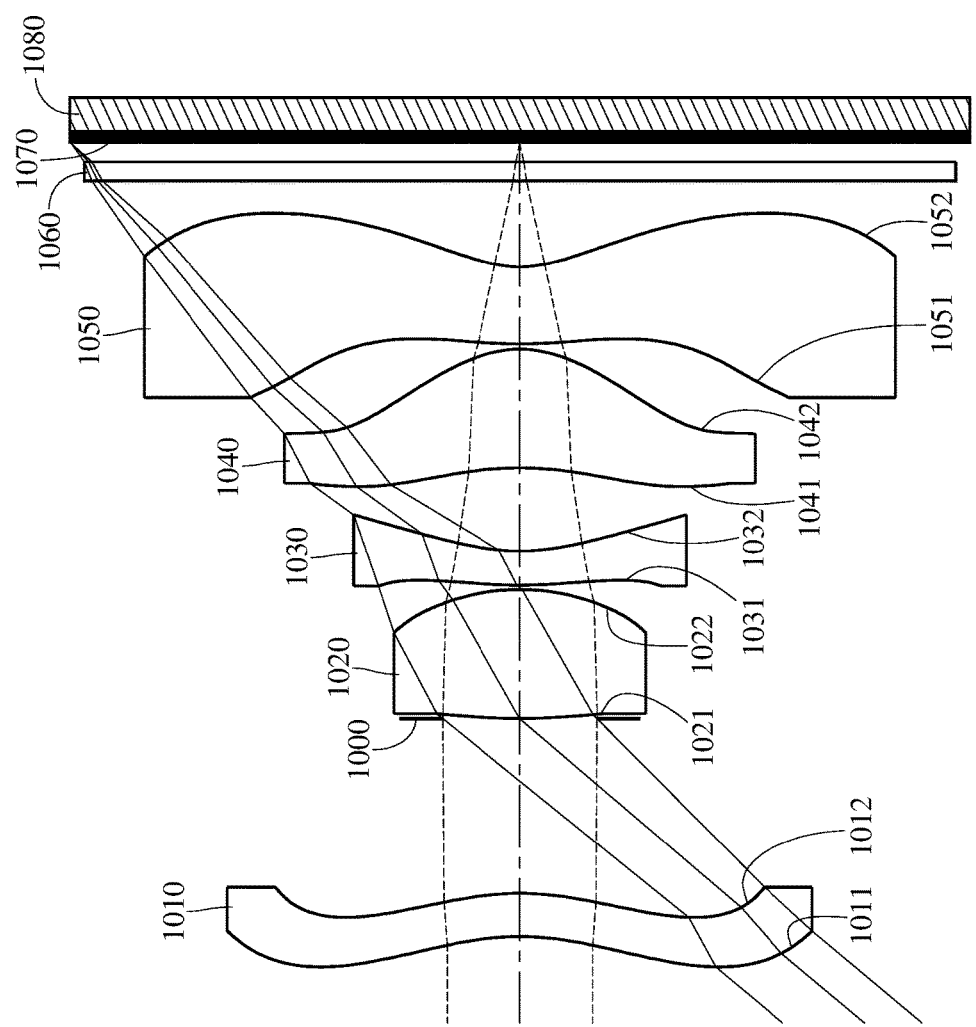
FIG. 19 is a schematic view of an image capturing unit according to the 10th embodiment of the present disclosure.
Figure 20:
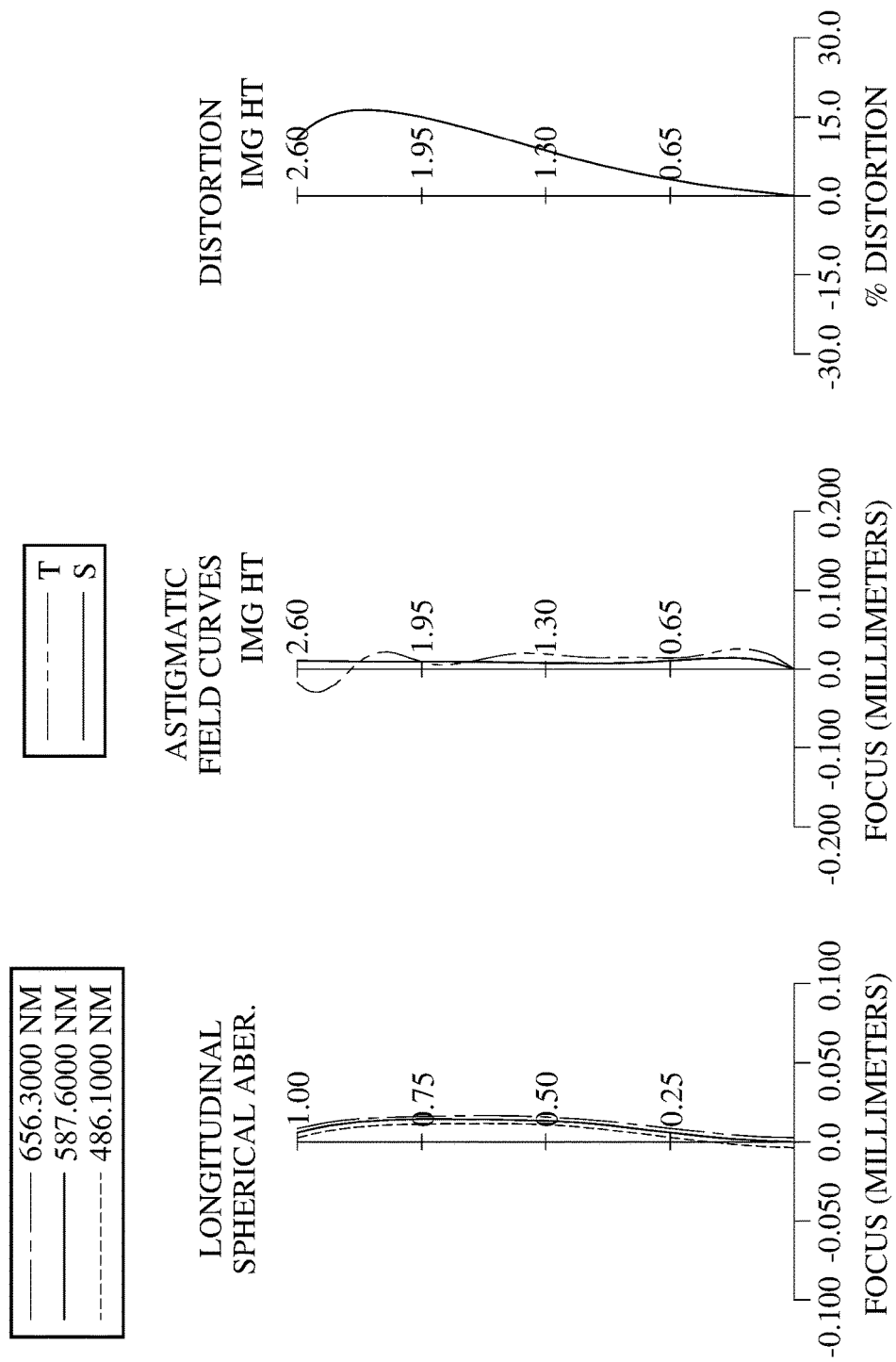
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical imaging lens assembly (its reference numeral is omitted) of the present disclosure and an image sensor 1080. The optical imaging lens assembly includes, in order from an object side to an image side, a first lens element 1010, an aperture stop 1000, a second lens element 1020, a third lens element 1030, a fourth lens element 1040, a fifth lens element 1050, an IR-cut filter 1060 and an image surface 1070. The optical imaging lens assembly includes five lens elements (1010, 1020, 1030, 1040 and 1050) with no additional lens element disposed between the first lens element 1010 and the fifth lens element 1050.

The first lens element 1010 with positive refractive power has an object-side surface 1011 being concave in a paraxial region thereof and an image-side surface 1012 being convex in a paraxial region thereof. The first lens element 1010 is made of plastic material and has the object-side surface 1011 and the image-side surface 1012 being both aspheric. The object-side surface 1011 of the first lens element 1010 has at least one convex critical point in an off-axial region thereof.

The second lens element 1020 with positive refractive power has an object-side surface 1021 being convex in a paraxial region thereof and an image-side surface 1022 being convex in a paraxial region thereof. The second lens element 1020 is made of plastic material and has the object-side surface 1021 and the image-side surface 1022 being both aspheric.

The third lens element 1030 with negative refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric.

The fourth lens element 1040 with positive refractive power has an object-side surface 1041 being concave in a paraxial region thereof and an image-side surface 1042 being convex in a paraxial region thereof. The fourth lens element 1040 is made of plastic material and has the object-side surface 1041 and the image-side surface 1042 being both aspheric.

The fifth lens element 1050 with negative refractive power has an object-side surface 1051 being convex in a paraxial region thereof and an image-side surface 1052 being concave in a paraxial region thereof. The fifth lens element 1050 is made of plastic material and has the object-side surface 1051 and the image-side surface 1052 being both aspheric. The image-side surface 1052 of the fifth lens element 1050 has at least one convex critical point in an off-axial region thereof.

The IR-cut filter 1060 is made of glass and located between the fifth lens element 1050 and the image surface 1070, and will not affect the focal length of the optical imaging lens assembly. The image sensor 1080 is disposed on or near the image surface 1070 of the optical imaging lens assembly.

The detailed optical data of the 10th embodiment are shown in Table 19 and the aspheric surface data are shown in Table 20 below.

TABLE 19

10th embodiment
f = 1.96 mm, Fno = 2.32, HFOV = 50.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.542 | (ASP) | 0.250 | Plastic | 1.566 | 37.4 | 201.96 |
| 2 | | −1.611 | (ASP) | 1.013 | | | | |
| 3 | Ape. Stop | Plano | | 0.002 | | | | |
| 4 | Lens 2 | 3.651 | (ASP) | 0.746 | Plastic | 1.544 | 56.0 | 1.77 |
| 5 | | −1.218 | (ASP) | 0.025 | | | | |
| 6 | Lens 3 | 2.618 | (ASP) | 0.200 | Plastic | 1.639 | 23.5 | −3.69 |
| 7 | | 1.203 | (ASP) | 0.482 | | | | |
| 8 | Lens 4 | −1.850 | (ASP) | 0.686 | Plastic | 1.544 | 56.0 | 1.49 |
| 9 | | −0.636 | (ASP) | 0.030 | | | | |
| 10 | Lens 5 | 2.290 | (ASP) | 0.447 | Plastic | 1.614 | 26.0 | −1.60 |
| 11 | | 0.635 | (ASP) | 0.500 | | | | |
| 12 | IR-cut filter | Plano | | 0.110 | Glass | 1.517 | 64.2 | — |
| 13 | | Plano | | 0.114 | | | | |
| 14 | Image | Plano | | — | | | | |

Note:
Reference wavelength is 587.6 nm (d-line).

TABLE 20

Aspheric Coefficients

| Surface # | 1 | 2 | 4 | 5 | 6 |
|---|---|---|---|---|---|
| k = | −8.9120E−01 | 1.0514E−01 | −6.3789E+01 | −5.3553E−01 | −4.3542E+00 |
| A4 = | 2.4892E−01 | 2.8431E−01 | 1.0697E−01 | 1.1187E−02 | −5.0745E−01 |
| A6 = | −1.5343E−01 | −1.3881E−01 | −3.4636E−01 | 3.9085E−01 | 1.2614E+00 |
| A8 = | 9.7530E−02 | 9.1184E−02 | −2.7019E−01 | −1.4552E+00 | −2.5723E+00 |
| A10 = | −4.0714E−02 | −2.4323E−02 | 7.6772E−01 | 4.7080E−01 | 2.6950E+00 |
| A12 = | 9.7687E−03 | −7.6164E−04 | −1.0646E+00 | 5.1877E−01 | −1.7863E+00 |
| A14 = | −9.8186E−04 | 2.1336E−03 | — | — | 6.6915E−01 |

| Surface # | 7 | 8 | 9 | 10 | 11 |
|---|---|---|---|---|---|
| k = | −1.7527E+00 | −4.4852E−01 | −1.7954E+00 | −9.0000E+01 | −5.5890E+00 |
| A4 = | −5.1519E−01 | 1.8250E−01 | 2.5252E−01 | −3.0886E−02 | −1.3847E−01 |
| A6 = | 1.1072E+00 | −3.1830E−02 | −6.0430E−01 | −3.4183E−01 | 9.0032E−02 |
| A8 = | −1.6913E+00 | 1.4800E−01 | 9.1624E−01 | 5.5624E−01 | −4.1461E−02 |
| A10 = | 1.5326E+00 | −2.2332E−01 | −5.8132E−01 | −4.7374E−01 | 1.2215E−02 |
| A12 = | −7.0712E−01 | 1.2539E−01 | 1.5246E−01 | 2.2415E−01 | −2.2357E−03 |
| A14 = | 1.2248E−01 | −2.8488E−02 | −8.0540E−03 | −5.3897E−02 | 2.2888E−04 |
| A16 = | — | 1.8139E−03 | −1.8544E−03 | 5.0951E−03 | −1.0012E−05 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following condtions:

10th Embodiment

| f [mm] | 1.96 | |R3/R4| | 3.00 |
|---|---|---|---|
| Fno | 2.32 | f/f4 | 1.32 |
| HFOV [deg.] | 50.0 | |f1|/R2 | −125.40 |
| V1/(V3 + V5) | 0.76 | f3/f5 | 2.31 |
| CT4/T34 | 1.42 | CRA [deg.] | 42.03 |
| T12/T23 | 40.60 | TL/ImgH | 1.77 |
| (T23 + CT3 + T34)/CT4 | 1.03 | Y11/ImgH | 0.65 |
| (T23 + T34 + T45)/T12 | 0.53 | Y52/f | 1.11 |
| |R2/R1| | 1.04 | Yc11/Yc52 | 0.81 |
| R3/R2 | −2.27 | — | |

11th Embodiment

Figure 21:
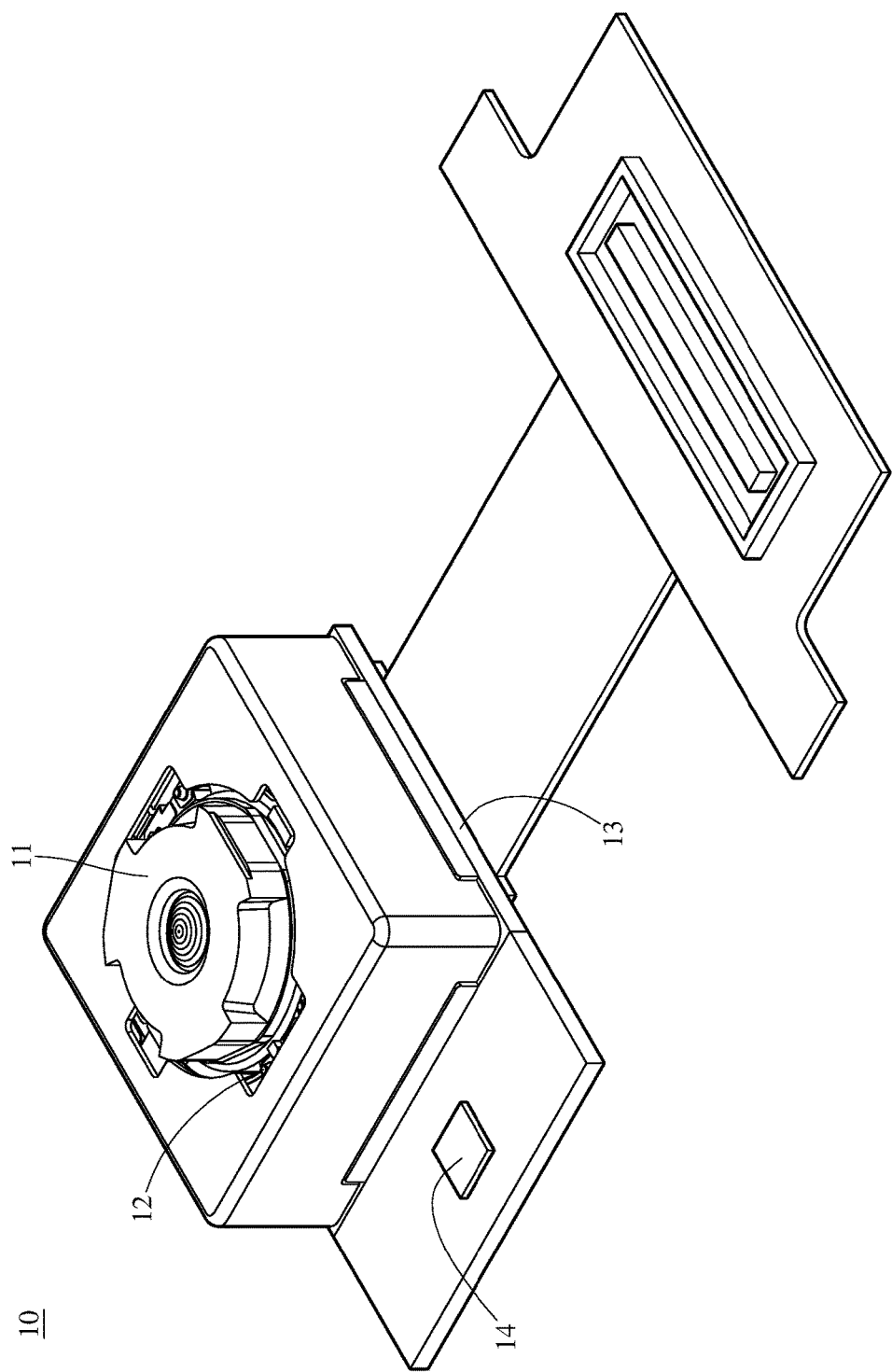
FIG. 21 is a perspective view of an image capturing unit according to the 11th embodiment of the present disclosure.

FIG. 21 is a perspective view of an image capturing unit according to the 11th embodiment of the present disclosure. In this embodiment, an image capturing unit 10 is a camera module including a lens unit 11, a driving device 12, an image sensor 13 and an image stabilizer 14. The lens unit 11 includes the optical imaging lens assembly disclosed in the 1st embodiment, a barrel and a holder member (their reference numerals are omitted) for holding the optical imaging lens assembly. The external light converges into the lens unit 11 of the image capturing unit 10 to generate an image, and the lens unit 11 along with the driving device 12 is utilized for image focusing on the image sensor 13, and the image is able to be digitally transmitted to an electronic component.

The driving device 12 can have auto focusing functionality, and different driving configurations can be through the use of voice coil motors (VCM), micro electro-mechanical systems (MEMS), piezoelectric systems, or shape memory alloy materials. The driving device 12 is favorable for the lens unit 11 to obtain a better imaging position, so that a clear image of the imaged object can be captured by the lens unit 11 with different object distances. The image sensor 13 (for example, CCD or CMOS) can be featured with high photosensitivity and low noise, disposed on the image surface of the optical imaging lens assembly to provide higher image quality.

The image stabilizer 14, such as an accelerometer, a gyroscope and a Hall effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

12th Embodiment

Figure 22:
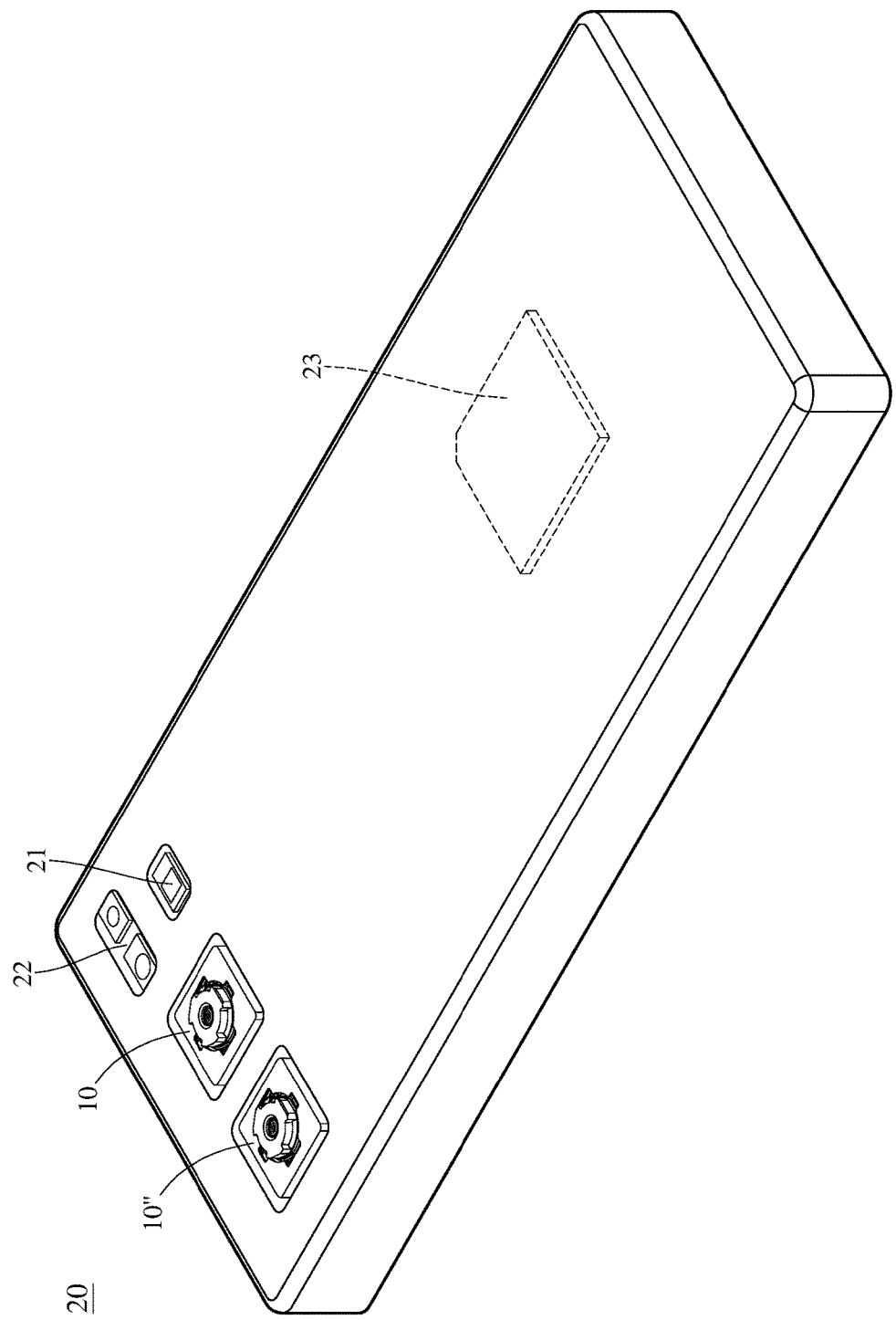
FIG. 22 is one perspective view of an electronic device according to the 12th embodiment of the present disclosure.
Figure 23:
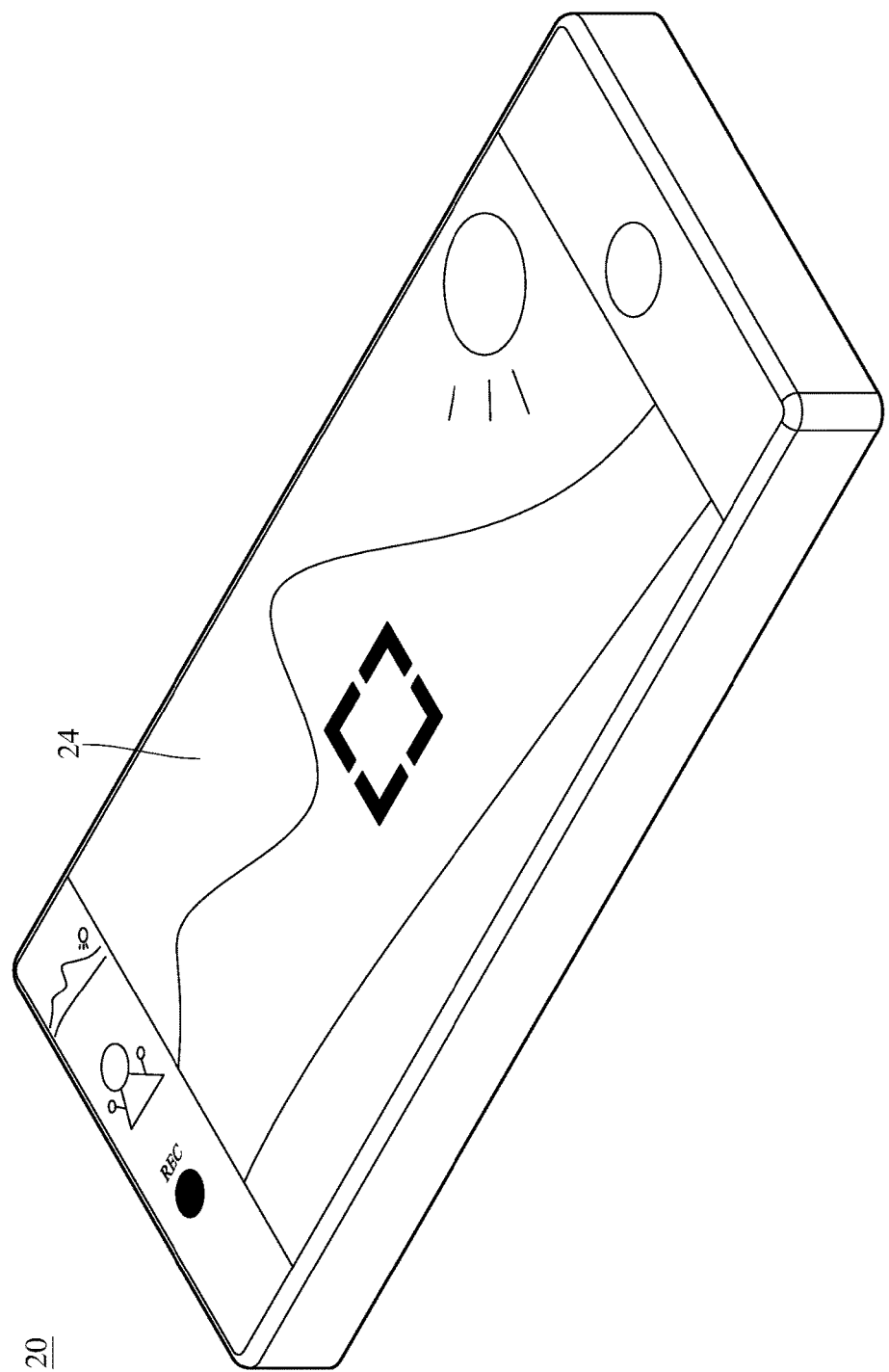
FIG. 23 is another perspective view of the electronic device in FIG. 22.
Figure 24:
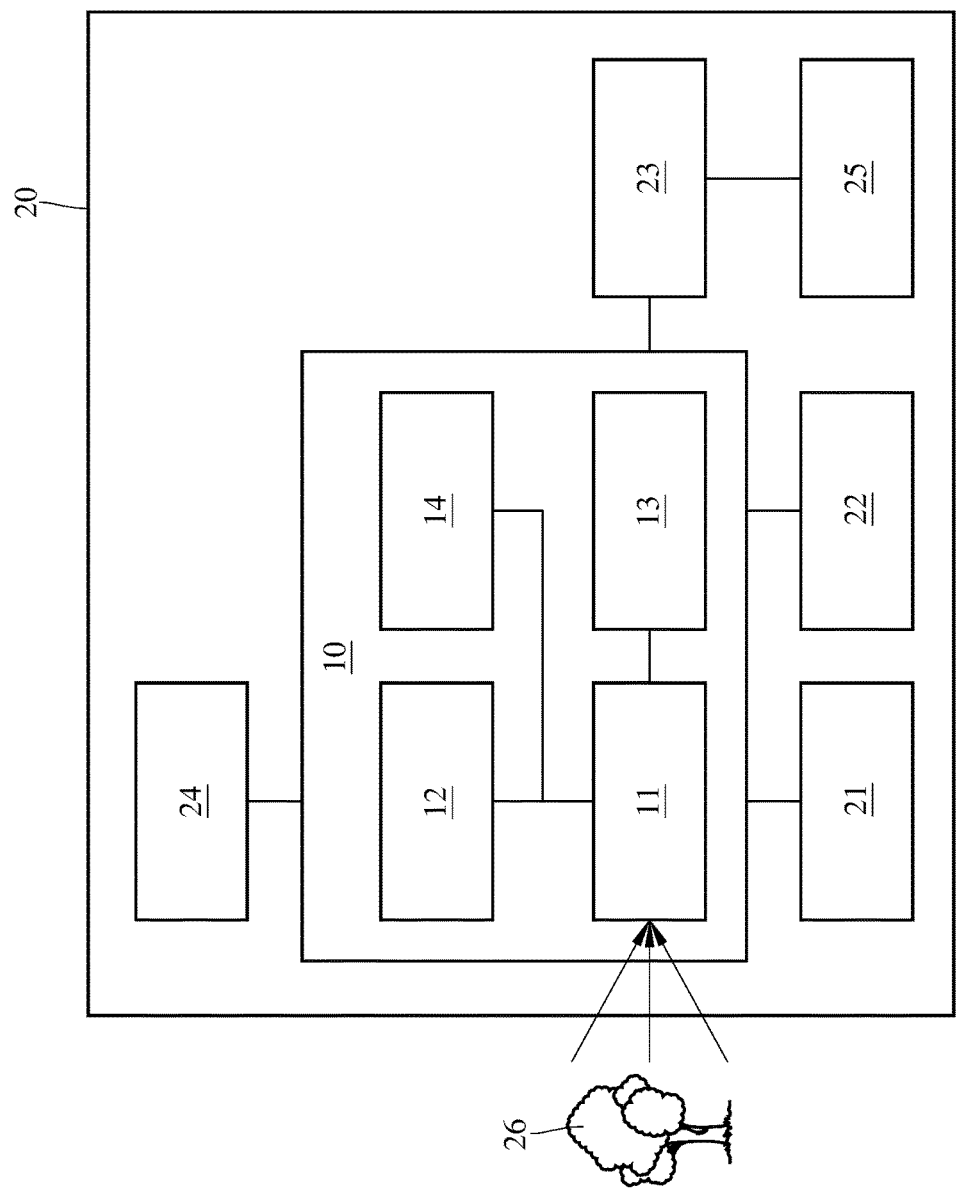
FIG. 24 is a block diagram of the electronic device in FIG. 22.

FIG. 22 is one perspective view of an electronic device according to the 12th embodiment of the present disclosure. FIG. 23 is another perspective view of the electronic device in FIG. 20. FIG. 24 is a block diagram of the electronic device in FIG. 20. In this embodiment, an electronic device 20 is a smart phone including the image capturing unit 10 disclosed in the 11th embodiment, an image capturing unit 10", a flash module 21, a focus assist module 22, an image signal processor 23, a user interface 24 and an image software processor 25. In this embodiment, the image capturing unit 10 is a wide-angle camera including the optical imaging lens assembly disclosed in the 1st embodiment, and the image capturing unit 10" is a camera including an optical system having small field of view, but the disclosure is not limited thereto. For example, both of the image capturing units 10, 10" can be wide-angle cameras. Furthermore, in this embodiment, the electronic device 20 includes two image capturing unit 10, 10", but the disclosure is not limited thereto. In some cases, the electronic device 20 can include only one image capturing unit 10, or the electronic device 20 can include more than two image capturing units.

When a user captures the images of an object 26 through the user interface 24, the light rays converge in the image capturing unit 10 to generate images, and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either infrared or laser. The user interface 24 can be a touch screen or a physical button. The user is able to interact with the user interface 24 and the image software processor 25 having multiple functions to capture images and complete image processing.

The smart phone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the optical imaging lens assembly of the image capturing unit 10 is featured with good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multiple camera devices, motion sensing input devices, wearable devices and other electronic imaging devices.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising five lens elements, the five lens elements being, in order from an object side to an image side:

a first lens element having an object-side surface being concave in a paraxial region thereof, wherein the object-side surface of the first lens element has at least one convex critical point in an off-axial region thereof, and the object-side surface of the first lens element is aspheric;

a second lens element having positive refractive power;

a third lens element with negative refractive power having an object-side surface being convex in a paraxial region thereof;

a fourth lens element having positive refractive power; and a fifth lens element having negative refractive power;

wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a focal length of the first lens element is f1, a curvature radius of an image-side surface of the first lens element is R2, and the following conditions are satisfied:

$0<(T23+T34+T45)/T12<2.2$; and $|f1|/R2\leq 0$.

2. The optical imaging lens assembly of claim 1, wherein the axial distance between the first lens element and the second lens element is T12, the axial distance between the second lens element and the third lens element is T23, the axial distance between the third lens element and the fourth lens element is T34, the axial distance between the fourth lens element and the fifth lens element is T45, and the following condition is satisfied:

$0.40<(T23+T34+T45)/T12<2.0$.

3. The optical imaging lens assembly of claim 1, wherein the focal length of the first lens element is f1, the curvature radius of the image-side surface of the first lens element is R2, and the following condition is satisfied:

$-1.35<|f1|/R2\leq 0$.

4. The optical imaging lens assembly of claim 1, wherein an Abbe number of the first lens element is V1, an Abbe number of the third lens element is V3, an Abbe number of the fifth lens element is V5, and the following condition is satisfied:

$0.75<V1/(V3+V5)<2.5$.

5. The optical imaging lens assembly of claim 1, wherein a central thickness of the fourth lens element is CT4, the axial distance between the third lens element and the fourth lens element is T34, and the following condition is satisfied:

$0.2 < CT4/T34 < 7.3$.

6. The optical imaging lens assembly of claim 1, wherein the axial distance between the first lens element and the second lens element is T12, the axial distance between the second lens element and the third lens element is T23, and the following condition is satisfied:

$3.00 < T12/T23 < 200$.

7. The optical imaging lens assembly of claim 1, wherein the axial distance between the second lens element and the third lens element is T23, the axial distance between the third lens element and the fourth lens element is T34, a central thickness of the third lens element is CT3, a central thickness of the fourth lens element is CT4, and the following condition is satisfied:

$0.46 < (T23+CT3+T34)/CT4 < 3.0$.

8. The optical imaging lens assembly of claim 1, wherein an axial distance between the object-side surface of the first lens element and an image surface is TL, a maximum image height of the optical imaging lens assembly is ImgH, a maximum effective radius of an image-side surface of the fifth lens element is Y52, a focal length of the optical imaging lens assembly is f, and the following conditions are satisfied:

$TL/ImgH < 2.0$; and $0.90 < Y52/f < 5.0$.

9. The optical imaging lens assembly of claim 1, wherein a maximum effective radius of the object-side surface of the first lens element is Y11, a maximum image height of the optical imaging lens assembly is ImgH, and the following condition is satisfied:

$0.35 < Y11/ImgH < 0.85$.

10. The optical imaging lens assembly of claim 1, wherein the first lens element has negative refractive power, a curvature radius of the object-side surface of the first lens element is R1, the curvature radius of the image-side surface of the first lens element is R2, and the following condition is satisfied:

$1.0 < |R2/R1|$.

11. The optical imaging lens assembly of claim 1, wherein the second lens element has an object-side surface being convex in a paraxial region thereof, the curvature radius of the image-side surface of the first lens element is R2, a curvature radius of the object-side surface of the second lens element is R3, and the following condition is satisfied:

$R3/R2 \leq 0$.

12. The optical imaging lens assembly of claim 11, wherein a focal length of the optical imaging lens assembly is f, a focal length of the fourth lens element is f4, and the following condition is satisfied:

$0 < f/f4 < 1.6$.

13. The optical imaging lens assembly of claim 11, wherein a focal length of the third lens element is f3, a focal length of the fifth lens element is f5, and the following condition is satisfied:

$0.40 < f3/f5 < 4.75$.

14. The optical imaging lens assembly of claim 1, wherein the second lens element has an image-side surface being convex in a paraxial region thereof, a curvature radius of an object-side surface of the second lens element is R3, a curvature radius of the image-side surface of the second lens element is R4, and the following condition is satisfied:

$1.0 < |R3/R4|$.

15. The optical imaging lens assembly of claim 1, wherein the third lens element has an image-side surface being concave in a paraxial region thereof.

16. The optical imaging lens assembly of claim 1, wherein the fourth lens element has an object-side surface being concave in a paraxial region thereof and an image-side surface being convex in a paraxial region thereof.

17. The optical imaging lens assembly of claim 1, wherein the fifth lens element has an image-side surface being concave in a paraxial region thereof, the image-side surface of the fifth lens element has at least one convex critical point in an off-axial region thereof, and the image-side surface of the fifth lens element is aspheric; a vertical distance between a non-axial critical point on the object-side surface of the first lens element and an optical axis is Yc11, a vertical distance between a non-axial critical point on the image-side surface of the fifth lens element and the optical axis is Yc52, and the following condition is satisfied:

$0.1 < Yc11/Yc52 < 1.0$.

18. The optical imaging lens assembly of claim 1, further comprising an aperture stop disposed between the first lens element and the second lens element, wherein an f-number of the optical imaging lens assembly is Fno, half of a maximum field of view of the optical imaging lens assembly is HFOV, a maximum chief ray angle of the optical imaging lens assembly is CRA, and the following conditions are satisfied:

$1.5 < Fno < 2.8$;

$45[\text{deg.}] < HFOV < 80[\text{deg.}]$; and $30[\text{deg.}] < CRA < 60[\text{deg.}]$.

19. An image capturing unit, comprising:
the optical imaging lens assembly of claim 1; and
an image sensor disposed on an image surface of the optical imaging lens assembly.

20. An electronic device, comprising:
the image capturing unit of claim 19.

21. An optical imaging lens assembly comprising five lens elements, the five lens elements being, in order from an object side to an image side:
a first lens element with negative refractive power having an object-side surface being concave in a paraxial region thereof;
a second lens element having positive refractive power;
a third lens element having negative refractive power;
a fourth lens element having positive refractive power; and
a fifth lens element with negative refractive power having an image-side surface being concave in a paraxial region thereof, wherein the image-side surface of the fifth lens element has at least one convex critical point in an off-axial region thereof, and the image-side surface of the fifth lens element is aspheric;
wherein an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a focal length of the first lens element is f1, a focal length of the third lens element is f3, a focal length of the fifth lens element is f5, a curvature radius of an image-side surface of the first lens element is R2, and the following conditions are satisfied:

$0 < (T23+T34+T45)/T12 < 2.2;$ $|f1|/R2 \leq 0;$ and $0.40 < f3/f5 < 4.75.$

22. The optical imaging lens assembly of claim 21, wherein the axial distance between the first lens element and the second lens element is T12, the axial distance between the second lens element and the third lens element is T23, the axial distance between the third lens element and the fourth lens element is T34, the axial distance between the fourth lens element and the fifth lens element is T45, and the following condition is satisfied:

$0.40 < (T23+T34+T45)/T12 < 2.0.$

23. The optical imaging lens assembly of claim 21, wherein the axial distance between the first lens element and the second lens element is T12, the axial distance between the second lens element and the third lens element is T23, and the following condition is satisfied:

$3.00 < T12/T23 < 200.$

24. The optical imaging lens assembly of claim 21, wherein the axial distance between the second lens element and the third lens element is T23, the axial distance between the third lens element and the fourth lens element is T34, a central thickness of the third lens element is CT3, a central thickness of the fourth lens element is CT4, and the following condition is satisfied:

$0.46 < (T23+CT3+T34)/CT4 < 3.0.$

25. The optical imaging lens assembly of claim 21, wherein the focal length of the third lens element is f3, the focal length of the fifth lens element is f5, and the following condition is satisfied:

$0.75 < f3/f5 < 4.25.$

* * * * *